| | 1 | 2 | 3 | 4 | 5 | 6 |
|---|---|---|---|---|---|---|
| 8 | ✱ 2 | & 7 | '' ' | TABULATE | BACK SPACE | TRAN |
| 7 | K k | Q q | $ 6 | ) ¼ | % ½ | Z z |
| 6 | W w | V v | J j | £ 5 | ( 9 | + = |
| 5 | U u | M m | B b | : ; | @ 4 | ¾ 8 |
| 4 | R r | D d | Y y | ? , | X x | / 3 |
| 3 | SHIFT | N n | C c | F f | . | — - |
| 2 | T t | A a | S s | H h | P p | G g |
| 1 | SPACE BAR | E e | O o | I i | L l | CA. R. |

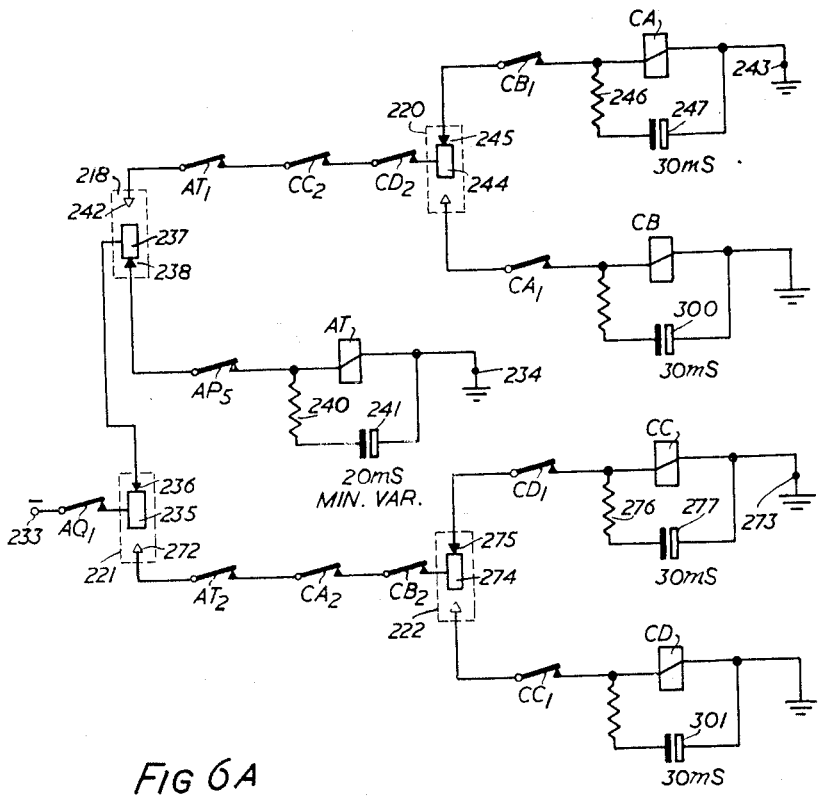
FIG 6A
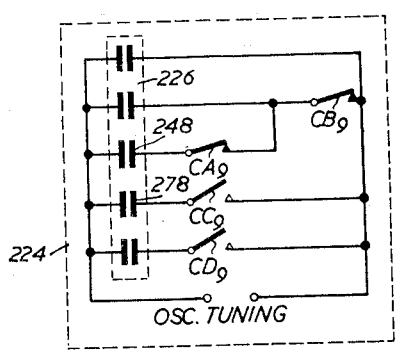
OSC. TUNING

United States Patent Office 3,241,115
Patented Mar. 15, 1966

3,241,115
CONTROL SYSTEMS FOR USE BY PARTIALLY OR TOTALLY PARALYZED PERSONS
Reginald George Maling, 34 Queen's Park, Aylesbury, England
Filed May 28, 1962, Ser. No. 197,977
Claims priority, application Great Britain, May 31, 1961, 19,635/61
14 Claims. (Cl. 340—147)

The present invention relates to control systems and particularly relates to means for providing control for a partially or totally paralysed person.

According to the present invention, a control system for operation by a partially or totally paralysed person comprises an electric transducer responsive to relatively small pressures exerted by the person and of the order of magnitude of respiratory pressures, and means for selecting a required controlled circuit, which means is controlled, at least in part, by the period of operation of the transducer.

According to a first form of the present invention, a control system for operation by a partially or totally paralysed person comprises a single electric transducer, which transducer is responsive to relatively small pressures exerted by the person, which pressures are of the order of magnitude of respiratory pressures, a number of controlled circuits, means for selecting a required controlled circuit, which means is controlled by the duration of operation of the transducer, and means for energising the required controlled circuit on the cessation of operation of the transducer.

According to a particular embodiment of the first form of the present invention, a very small on/off function is sequenced through a relay and a selector network of the control system, and finally presented to latching relays having power contacts.

According to a second form of the present invention a control system for operation by a partially or totally paralysed person comprises a number of electric transducers, each transducer being responsive to relatively small pressures exerted by the person, which pressures are of the order of magnitude of respiratory pressures, a number of controlled circuits, means for selecting a required controlled circuit, which means is controlled by the duration of operation of a first transducer and is further controlled by the duration of operation of a second transducer following the cessation of operation of the first transducer, and means for energising the required controlled circuit on the cessation of operation of the second transducer.

According to a particular embodiment of the second form of the present invention a first very small on/off function is caused to pulse a first uniselector switch of the control system, a second very small on/off function is caused to pulse a second uniselector switch of the control system, the second uniselector switch being electrically linked to the first uniselector switch, and, after the cessation of application to the control system of the second on/off function following the cessation of application to the control system of the first on/off function, any one of a number of controlled circuits is selected and energised.

A third form of the present invention is similar in principle to the second, except for the fact that the required controlled circuit is energized when the second transducer is operated.

According to a particular embodiment of the third form of the present invention, a first very small on/off function is caused to operate a first relay selector circuit of the control system, cessation of application to the control system of the first on/off function is caused to operate a second relay selector circuit of the control system, and by application of a second very small on/off function, any one of a number of controlled circuits is selected and energised.

The control circuits of the three embodiments of the present invention enable a partially or totally paralysed person to select and energise any one of a number of electric circuits. These electric circuits may take any form but, according to the second and third embodiments, they preferably take the form of the individual circuits of an electric typewriter, any one of which, when energised, performs a particular typewriter operation.

In order that the invention may be more clearly understood, three control circuits in accordance therewith will now be described, reference being made to the accompanying drawings wherein:

FIGURE 3 is a chart of the second embodiment of the present invention showing one form of matrix layout for typewriter control;

FIGURE 5 is a chart of the third embodiment of the present invention showing one form of matrix layout for typewriter control; and FIGURES 6A to 6E are circuit diagrams of one form of control system of the third embodiment of the present invention showing the selector circuits and energising mechanism.

Figure 1A:
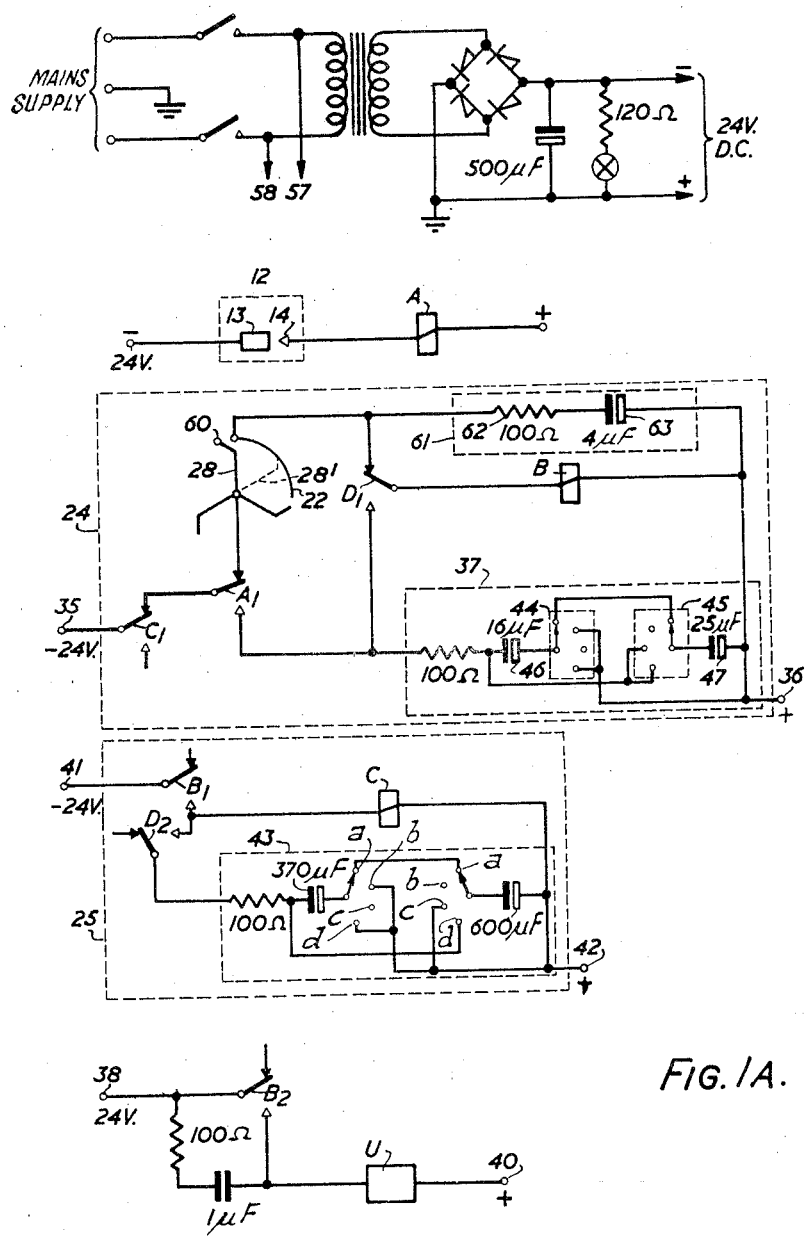
FIGURES 1A and 1B are circuit diagrams of one form of control system of the first embodiment of the present invention showing the selector and energising mechanism.
Figure 1B:
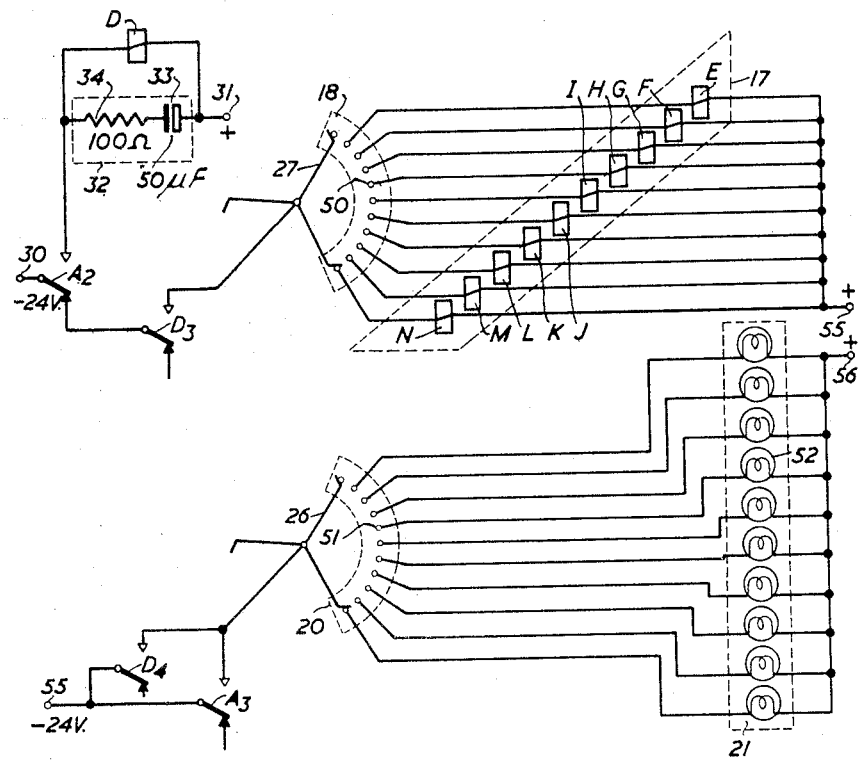

Referring to FIGURES 1A and 1B, and considering broadly the operation of one form of the control system, the invention provides means which, on closure of the vacuum switch 12 (FIGURE 1A) having contacts 13 and 14, after plugging the control system into the mains supply, select and energise at least one of a number of electric circuits, hereinafter referred to as functions, which are plugged in to power sockets shown generally at 15 (FIGURE 1B). These electric circuits may take any form, however one of these circuits, as will be realised hereinafter, may be the circuit of an electric typewriter. The power sockets may be connected to the mains supply by switching means shown generally at 16 containing contacts of latching relays shown generally at 17. Each time one of these latching relays is energised, its contacts are changed over from the condition prior to energisation, when they are in their non-operative positions, and are latched in their new positions, hereinafter referred to as their operative positions. Resetting is effected by re-energisation. The latching relays are connected to one bank of contacts shown generally at 18, of a uniselector having three banks of contacts, the uniselector being operated by uniselector coil U (FIGURE 1A). A second band of uniselector contacts is shown generally at 20, and these are connected to white lamps shown generally at 21. The third bank of uniselector contacts is shown generally at 22. The white lamps are contained in an Indicator Unit which also contains green and red lamps (FIGURE 2), these having switching means shown generally at 23 containing other contacts of the latching relays. The Indicator Unit is a box having one face of translucent material on which are printed by any suitable means, the functions available for selection, and the white, green and red lamps are so disposed in the Indicator Unit that immediately behind the printing corresponding to any particular function there is one white, one green and one red lamp. On the plugging the control system into the mains supply, all the green lamps light up and, shining through the translucent material, throw the printing into relief.

Closure of the vacuum switch 12 (FIGURE 1A) causes energisation of the circuits shown generally at 24 and 25 which together constitute a flip-flop circuit and which through relay B, pulses the uniselector relay U. A uniselector wiper 26 (FIGURE 1B), being one of three wipers, then steps round the bank of contacts shown generally at 20, thus lighting in turn the white lamps shown generally at 21; the lighting up of a particular white lamp indicating the particular function which has been selected. Pulsing of the uniselector coil U also causes the uniselector wiper 27, being one of three wipers, to step round the bank of contacts shown generally at 18, to which, as hereinbefore described, are connected the latching relays 17. To energise a particular function, the vacuum switch 12 is opened when the white lamp corresponding to the required function lights up; the opening of the vacuum switch 12 gives a pulse to a particular latching relay, which in turn causes energisation of the required function which remains energised until the latching relay is repulsed. Pulsation of the particular latching relay also causes the green lamp corresponding to the selected function to be switched off, and the corresponding red lamp to be switched on, thus affording a distinctive visual indication that the particular function has been energised. Continued opening of the vacuum switch 12 causes the wipers of the uniselector to return to, and remain, in their "homed" positions, those being reached when uniselector wiper 28 is in the position shown.

The operation of the control system will now be considered in detail, it being assumed that a means of control is required for a partially or totally paralysed person, who is only capable of producing in the mouth, pressures a little above, and a little below the atmospheric pressure. The person is linked to the control system by means of a piece of tubing which at one end is attached to a suitable mouthpiece, and at the other end is attached to the fixed vacuum switch 12 (FIGURE 1A). The control system is plugged into the mains supply and when the person applies a pressure to the mouthpiece which is a little below the atmospheric pressure, contact 14 of vacuum switch 12 closes with contact 13. Relay A is thus energised and changes over its three contacts $A_1$, $A_2$ and $A_3$ from the positions shown. With the contact $A_2$ (FIGURE 1B) in its new position a circuit is completed between negative terminal 30 and positive terminal 31, comprising contact $A_2$ in its new position and two parallel circuits, one being a holding circuit shown generally at 32 containing capacitor 33 and resistance 34, and the other consisting of relay D. Relay D is thus energised and changes over its four contacts $D_1$, $D_2$, $D_3$ and $D_4$ from the positions shown. With contacts $A_1$ and $D_1$ in their new positions a circuit is completed between negative terminal 35 and positive terminal 36, comprising contact $C_1$ in the position shown, contact $A_1$ in its new position and two parallel circuits, one being a variable capacitance holding circuit shown generally at 37, and the other consisting of contact $D_1$ in its new position and relay B. Relay B is thus energised and changes over its two contacts $B_1$ and $B_2$ from the positions shown. With contact $B_2$ in its new position, the circuit between negative terminal 38 and positive terminal 40 containing the uniselector coil U, is completed, thereby energising the uniselector coil. Also with contacts $B_1$ and $D_2$ in their new positions a circuit is completed between negative terminal 41 and positive terminal 42, comprising contact $B_1$ in its new position and two parallel circuits, one consisting of relay C, and the other consisting of contact $D_2$ in its new position, and a variable capacitance holding circuit shown generally at 43. Relay C is thus energised and changes over its only contact $C_1$ from the position shown, thereby breaking the circuit between the terminals 35 and 36, containing relay B. The presence of the holding circuit 37 prevents immediate de-energisation of relay B, thus causing contacts $B_1$ and $B_2$ to remain, for a short period of time, in their new positions. When relay B is de-energised contacts $B_1$ and $B_2$ return to the positions shown but energisation of relay C continues due to the presence of the holding circuit 43, thereby keeping contact $C_1$ over in its new position for a short period of time. When relay C is de-energised contact $C_1$ returns to the position shown and relay B is re-energised due to the re-completion of the circuit, as hereinbefore described, between terminals 35 and 36. Thus, continued suction applied to the vacuum switch causes continued pulsing of relay B, the pulsing rate being dependent on the time constants of each of the holding circuits 37 and 43. These holding circuits are identical in all but one respect, this being that the capacitances of the capacitors in each of the two circuits are different; the two circuits will therefore be described, making reference to one circuit only, namely that which is shown generally 37. Contained in this circuit are two ganged four position switches 44 and 45. By suitable selection of the switch positions $a$, $b$, $c$, $d$, the overall capacitance of the circuit may be chosen to have any one of four values, each one of these depending on the particular capacitor or combination of capacitors contained in the circuit. Thus in position $a$, capacitors 46 and 47 are placed in series in the circuit; in position $b$, capacitor 46 only remains in the circuit; in position $c$, capacitor 47 only remains in the circuit, this capacitor having a different capacitance to capacitor 46, and in position $d$ capacitors 46 and 47 are placed in parallel in the circuit.

Figure 2:
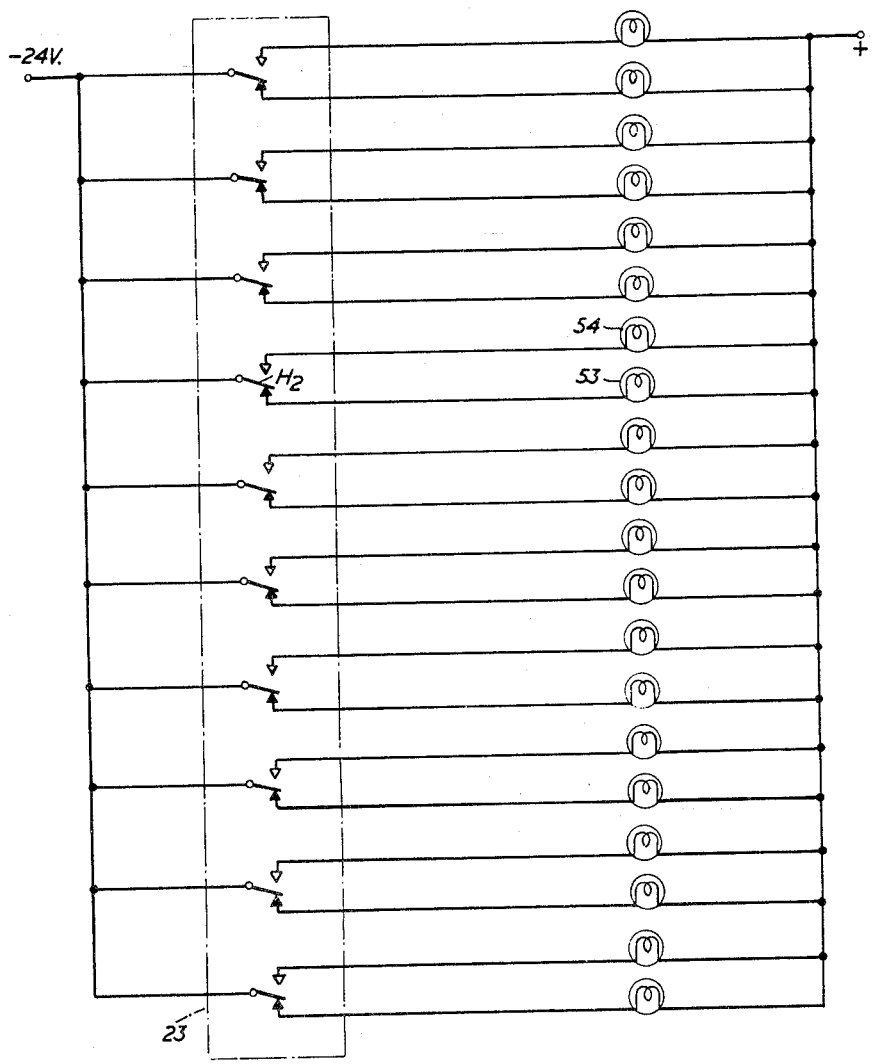
FIGURE 2 is a further circuit diagram of the first embodiment of the present invention showing a part of one form of indicator unit contained in the control system.

The continued pulsing of relay B having the said contact $B_2$ causes continued pulsing of the uniselector coil U and thus continued stepping of the uniselector wipers 26, 27 and 28 over their respective contacts at a rate determined by the settings of the switches in circuits 37, 43. It will now be assumed, for the purpose of illustration, that it is required to select and energise the function which is plugged into power socket 48 (FIGURE 1B) which may be connected to the mains supply by means of contact $H_1$ of latching relay H. Latching relay H is connected to a uniselector contact 50 having a corresponding uniselector contact 51 which is connected to white lamp 52. Referring to FIGURE 2, it is seen that relay H has a further contact $H_2$ which, in the position shown, causes energisation of the green lamp 53, but when latching relay H is energised causes energisation of the red lamp 54. In order to select the required function the vacuum switch 12 (FIGURE 1A) is closed until wiper 26 makes contact with contact 51, whereupon wiper 27 makes contact with contact 50, and wiper 28 is in the position represented by 28'. At this instant a circuit is completed between negative terminal 55 and positive terminal 56 consisting of contacts $A_3$ and $D_4$ in their new positions, wiper 26, contact 51 and white lamp 52. White lamp 52 therefore lights up indicating that the function plugged into power socket 48 has been selected. When the person sees white lamp 52 light up, he releases the suction applied to the mouthpiece. The vacuum switch 12 is thereby opened, thus immediately de-energising relay A whose contact $A_2$ returns to the position shown. The movement of contact $A_2$ breaks the circuit between terminals 30 and 31 containing relay D, but due to the presence of the holding circuit shown generally at 32, relay D remains energised for a short period of time, thus keeping for this period contact $D_3$ over in its new position. A circuit is thus completed between negative terminal 30 and positive terminal 55 consisting of contact $A_2$ in its position shown, contact $D_3$ in its new position, wiper 27, contact 50 and latching relay H. Latching relay H is thus energised and changes over its contacts $H_1$ and $H_2$ from the positions shown. Movement of contact $H_1$ connects power socket 48 across terminals 57 and 58 thus energising the selected function, and movement of contact $H_2$ (FIGURE 2) energises the red lamp 54 which provides the visual indication that the required function has been energised. Continued opening of the vacuum switch 12 causes, in the manner to be described in the following paragraph, the uniselector wipers 26, 27 and 28 to step round their associated contacts until wiper 28 makes contact with contact 60, at which instant rotation of the wipers ceases.

When the vacuum switch is open, contacts $A_1$, $D_1$ and $D_2$ are in the positions shown due to the de-energisation of relays A and D, and holding circuits 37 and 43 are disconnected from relays B and C respectively. When contact $C_1$ of relay C is in the position shown a circuit is completed between negative terminal 35 and positive terminal 36 consisting of contact $C_1$ in the position shown, contact $A_1$ in the position shown, wiper 28 in any general position indicated by 28′, contact 22 and two parallel circuits, one consisting of the holding circuit 61, and the other containing contact $D_1$ in the position shown and relay B. Relay B is thereby energised and causes interaction between itself and relay C in the manner previously described; this interaction causes the pulsing of uniselector coil U and thus the stepping of wipers 26, 27 and 28. The rate at which uniselector coil U is pulsed depends on the time constant of the holding circuit 61 which consists of resistance 62 and capacitor 63. It will be realised that since, when the vacuum switch 12 is opened, contact $A_1$ is immediately returned to the position shown due to the de-energisation of relay A, relay B can only be re-energised and hence stepping of the uniselector wipers 26, 27 and 28 can only continue, when relay D is de-energised, whereupon contact $D_1$ returns to the position shown. The de-energisation of relays A and D thus prevent through the return of contacts $A_3$, $D_4$ and $A_2$, $D_3$ to the positions shown, the lighting up of further white lamps and the energisation of further latching relays respectively.

Cancelling the energised function is effected by causing stepping of the uniselector by closure of vacuum switch 12 as before, and reopening switch 12 when that function is reached, so that the particular latching relay is re-energised, and caused to change over its contacts from their operative positions to their non-operative positions.

If a second function is to be energised during the time that the first function is energised, stepping of the uniselector is initiated again, and the contacts of vacuum switch 12 opened when the second function is reached.

It will be understood that the above embodiment may take different forms without departing from the scope of the invention, and in one of these forms a pressure switch may be used instead of the vacuum switch 12.

In FIGURE 3 there are shown the various typewriter operations arranged in a matrix. Any particular typewriter operation is determined by selecting firstly, the column of the matrix and secondly, by selecting the required row in the selected column. Thus "d" is selected by first selecting column 2 and then selecting the fourth row in that column. It will also be seen from FIGURE 3 that there is a space marked "TRAN" provided in the sixth row and eighth column of the matrix. This space is used in conjunction with auxiliary circuits, not shown in FIGURES 1A and 1B and FIGURES 4A and 4B, and fitted only when the person is provided with the control circuits of the first and second forms of the present invention. The auxiliary circuits allow the person to have control over both control circuits from one mouthpiece, thus they allow the person, by using the circuit of FIGURES 1A and 1B, to have control over the electric typewriter. They also allow the control of the person, on selection of "TRAN," to be returned to the circuit of FIGURES 1A and 1B; in this event the electric typewriter is switched off.

Figure 4A:
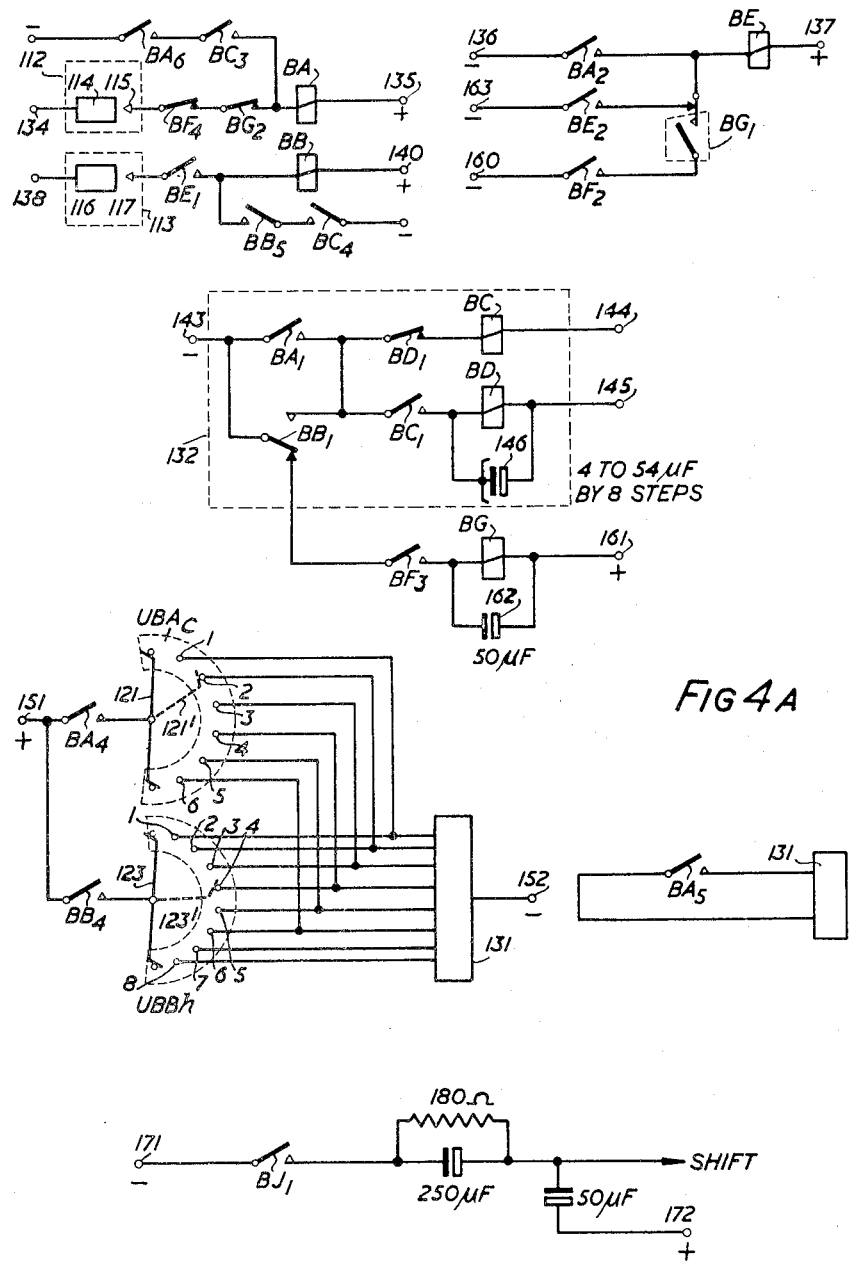
FIGURES 4A and 4B are circuit diagrams of one form of control system of the second embodiment of the present invention showing the selector and energising mechanism.
Figure 4B:
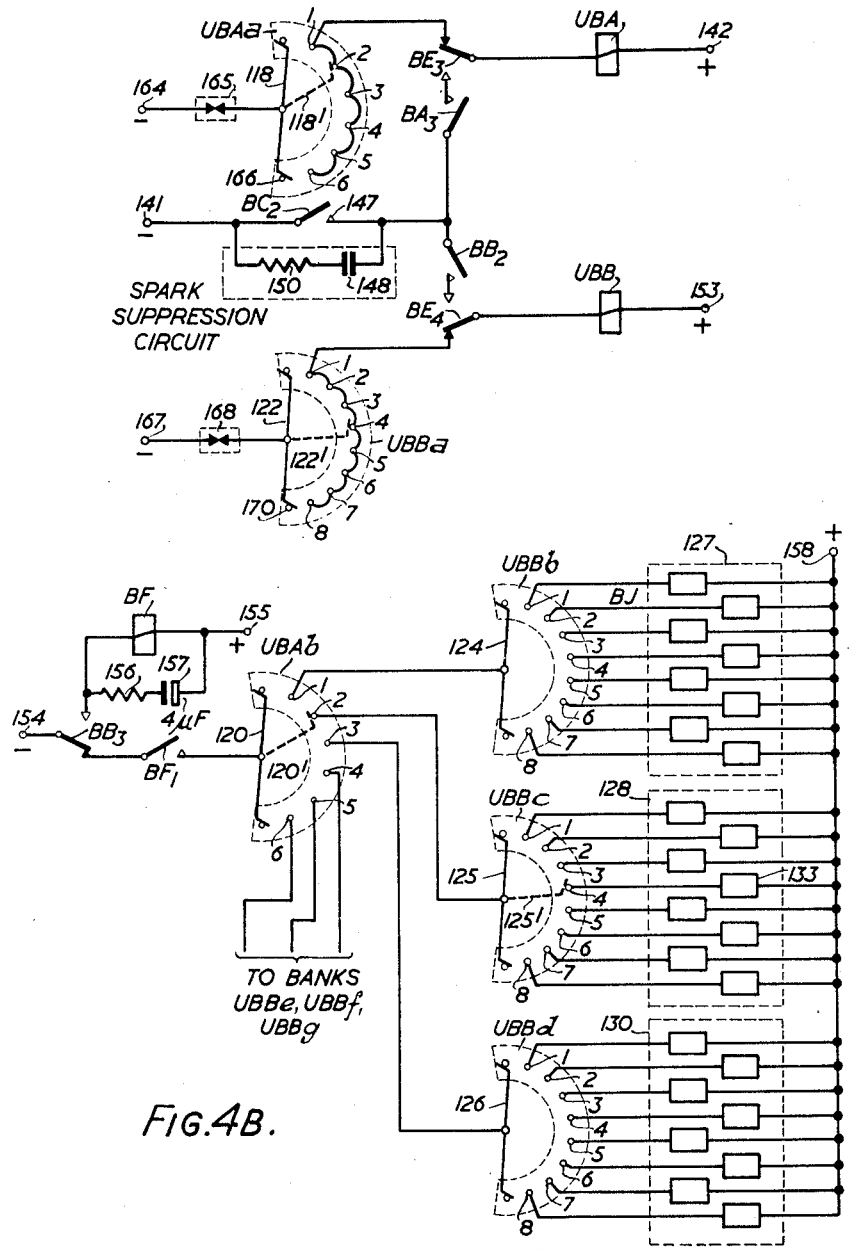

In the control circuit of FIGURES 4A and 4B, there are two manually operated switches 112, 113 (FIGURE 4A), which control respectively uniselectors UBA and UBB (FIGURE 4B); switch 112 has contacts 114 and 115, and switch 113 has contacts 116 and 117. Uniselectors UBA, UBB are of known form and each comprises a number of contact banks, each being provided with its own double-armed wiper. Only three banks of contacts UBA*a*, UBA*b* and UBA*c* of uniselector UBA are used, these being provided with wipers 118, 120 and 121 respectively. Only eight banks of contacts UBB*a*, UBB*b*–UBB*g* and UBB*h* of uniselector UBB are used, banks UBB*a* and UBB*h* being provided with wipers 122 and 123 respectively. The wipers associated with banks UBB*b*–UBB*g* are separately connected to six contacts of the bank UBA*b* of uniselector UBA; for convenience only banks UBB*b*, UBB*c* and UBB*d* have been shown, their associated wipers 124, 125 and 126 being respectively connected to contacts 1, 2 and 3 of bank UBA*b*. Eight contacts of each bank of banks UBB*b*–UBB*g* are connected to electric circuits any one of which when energised causes one of the typewriter operations shown in FIGURE 3 to be performed. The circuits associated with banks UBB*b*–UBB*d* are shown generally at 127, 128 and 130 respectively. Six and eight contacts respectively of banks UBA*c* and UBB*h* are connected to a loudspeaker circuit shown generally at 131 (FIGURE 4A). The wipers of the various banks of the uniselectors are driven round together by an electro-magnet, stepping from contact to contact each time the solenoids of uniselectors UBA and UBB are pulsed.

Closure of the vacuum switch 112 energises the flip-flop circuit which is shown generally at 132 (FIGURE 4A) and which pulses the coil of uniselector UBA thus causing stepping of the wipers of uniselector UBA. The stepping of the wiper 120 over the contacts of bank UBA*b* causes successive scanning of the six matrix columns illustrated in FIGURE 3. A particular matrix column is selected by opening the switch 112 when the wiper 120 is on the corresponding contact; when switch 112 is opened the flip-flop circuit is de-energised and thus wiper 120 remains on the selected contact. Closure of the pressure switch 113 after opening of the vacuum switch 112 causes re-energisation of the flip-flop circuit 132 which pulses uniselector UBB, thus causing stepping of the wipers of uniselector UBB. The wiper which steps over the contacts of one of the banks UBB*b*–UBB*g* which is connected to the contact selected by wiper 120 of uniselector UBA, causes successive scanning of the eight row positions present in the selected matrix column. A particular row position is selected by opening the switch 113 when the appropriate wiper is on the corresponding contact. When the switch 113 is opened the flip-flop circuit is de-energised and thus the appropriate wiper remains on the selected contact; also a unique circuit is completed to the typewriter control circuit associated with the selected matrix row and column and the typewriter operation controlled by that circuit is performed. After a short delay the wipers associated with the banks of contacts of both the uniselectors are automatically returned to their "homed" positions.

While the matrix columns and the row positions of any selected column are being scanned, the wipers 121 and 123 step over the contacts of uniselector banks UBA*c* and UBB*h* respectively. As each wiper steps over its associated contacts a succession of notes of different frequencies is heard from the loudspeaker circuit 131; these notes help the operator to identify at any given instant the particular column or the particular row which has been selected. To further aid the operator, the notes heard when the matrix columns are being scanned are made to be an octave lower than the notes heard when the matrix rows in any given column are being scanned, the octave variation being produced by introducing, a capacitor (not shown) into the loudspeaker circuit 131 when the vacuum switch 112 is closed.

The operation of the control system will now be considered in detail, it being assumed that a means of control is required for a partially or totally paralysed person who is only capable of producing in the mouth pressures a little above and a little below atmospheric pressure, and that the person requires to type the lower case letter "d" present in the second column and fourth row of the matrix illustrated in FIGURE 3. The electric circuit required to be energised to perform this operation is shown generally at 133 (FIGURE 4B).

The person is linked to the control system by means of a piece of tubing one end of which is attached to a suitable mouthpiece, and the other end of which is forked to form two arms, one arm being attached to vacuum switch 112 and the other arm being attached to pressure switch 113 (FIGURE 4). The control system is plugged into the mains' supply and when the person applies a pressure to the mouthpiece which is a little below the atmospheric pressure, contact 115 of vacuum switch 112 closes with contact 114. On closure of vacuum switch 112 a circuit is completed between negative terminal 134 and positive terminal 135, comprising switch 112, relay contacts $BF_4$ and $BG_2$ in the positions shown, and relay BA. Relay BA is thus energised, and changes over its five contacts $BA_1$, $BA_2$, $BA_3$, $BA_4$ and $BA_5$, from the positions shown. With contact $BA_2$ in its new position the circuit is completed from negative terminal 136 through relay BE to positive terminal 137. Relay BE is thus energised and causes its four contacts $BE_1$, $BE_2$, $BE_3$ and $BE_4$ to change over from the positions shown. With contact $BE_2$ in its new position a holding circuit for relay BE is completed. Contact $BE_1$ in its new position prepares for completion the circuit contained between negative terminal 138 and positive terminal 140, completion only being attained when contacts 116 and 117 of pressure switch 113 are closed. It will be realised that the circuit between terminals 138 and 140 can only be so prepared when vacuum switch 112 is closed before pressure switch 113 since only then is relay BE energised; thus the arrangement as hereinbefore described ensures that a particular typewriter operation can only be performed if vacuum switch 112 is closed before pressure switch 113. Contact $BE_3$ in its new position prepares for completion the circuit contained between negative terminal 141 and positive terminal 142; since relay contact $BA_3$ is changed over from the position shown due to the energisation of relay BA, completion of the circuit between terminals 141 and 142 is attained when relay contact $BC_2$ is changed over from the position shown. Movement of contact $BC_2$ is governed by the operation, which will now be described, of the flip-flop circuit shown generally at 132.

Since relay contact $BA_1$ is changed over from the position shown due to the energisation of its relay BA, a circuit is completed between negative terminal 143 and positive terminal 144 comprising relay contact $BD_1$ in the position shown and relay BC. Relay BC is thus energised and changes over its two contacts $BC_1$ and $BC_2$ from the positions shown. Contact $BC_1$ in its new position completes a circuit between negative terminal 143 and positive terminal 145 comprising contacts $BA_1$ and $BC_1$ in their new positions, relay BD and a holding capacitor 146 in parallel with relay BD. Relay BD is thus energised and changes over its only contact $BD_1$ from the position shown thereby breaking the circuit between terminals 143 and 144 and de-energising relay BC. Contact $BC_1$ then returns to the position shown thereby breaking the circuit between terminals 143 and 145; the presence of capacitor 146 prevents immediate de-energisation of relay BD. When relay BD is finally de-energised, its contact $BD_1$ returns to the position shown and relay BC is re-energised. Thus it is seen that energisation of the flip-flop circuit shown generally at 132 causes alternate pulsing of relays BC and BD, the pulsing rate being dependent on the capacitance of capacitor 146, thereby causing contact $BC_2$ to make and break alternately with contact 147. Capacitor 148 and resistance 150, in parallel with contact $BC_2$ forms a spark suppression circuit for relay contact $BC_2$. As has been hereinbefore described relay contacts $BE_3$ and $BA_3$ are changed over from the positions shown, so that when relay contact $BC_2$ changes over from the position shown a circuit is completed between negative terminal 141 and positive terminal 142, and when relay contact $BC_2$ returns to the position shown, this circuit is broken. Thus the alternate make and break of contact $BC_2$ causes pulsing of the coil of uniselector UBA (FIGURE 4B) and the wipers of uniselector banks UBA$a$, UBA$b$ and UBA$c$ step over their associated contacts.

Due to the energisation of relay BA its contact $BA_4$ is changed over from the position shown, and as wiper 121 steps over the contacts of bank UBA$c$, a circuit is alternately made and broken between positive terminal 151 and negative terminal 152, comprising relay contact $BA_4$ in its new position, wiper 121, any one of the contacts of bank UBA$c$ and the loudspeaker circuit shown generally at 131. Energisation of relay BA also causes its contact $BA_5$ to change over from the position shown, thereby including in the loudspeaker circuit the capacitor which lowers the notes emitted by the loudspeaker by one octave. Thus while the vacuum switch 112 remains closed the matrix columns are successively scanned and a succession of distinctive notes of different frequencies are heard by the person, which helps him to identify at any given instant the matrix column which is being scanned.

When the person releases suction, vacuum switch 112 is opened and the circuit between terminals 134 and 135 is broken; relay BA is immediately de-energised and returns its contacts $BA_1$, $BA_2$, $BA_3$, $BA_4$ and $BA_5$ to the positions shown. The opening of relay contact $BA_1$, breaks the circuits between terminals 143, 144 and 145, thus preventing further energisation of relays BC and BD. With relays BA and BC de-energised, their contacts $BA_3$ and $BC_2$ are in the positions shown, and since relay contact $BE_3$ is in its new position due to the continued energisation of relay BE, the circuit between terminals 141 and 142 containing the coil of uniselector UBA is broken. Further pulsing of the coil of uniselector UBA and scanning of further matrix columns are thus prevented. In the result, the wipers of uniselector UBA are retained on the contacts engaged when switch 112 was opened, and, in particular, wiper 120 is connected to the wiper of the bank of uniselector UBB (FIGURE 4B) corresponding to the desired matrix column. If, for example, the second matrix column, corresponding to bank UBB$c$, is to be selected, pulsing of the coil of uniselector UBA is stopped when the wipers are on the second contacts in the banks, and in particular, when wiper 120 is on contact 2 of bank UBA$b$.

When the person subsequently applies a pressure to the mouthpiece which is a little above atmospheric pressure, contact 117 of pressure switch 113 closed with contact 116. As hereinbefore described, relay BE remains energised, and thus relay contact $BE_1$ remains closed. Closure of switch 113 thus completes a circuit between negative terminal 138 and positive terminal 140 comprising switch 113, relay contact $BE_1$ in its new position and relay BB. Relay BB is thus energised and changes over its four contacts $BB_1$, $BB_2$, $BB_3$ and $BB_4$. Relay contact $BB_1$ in its new position completes a circuit between negative terminal 143 and positive terminal 144, comprising contact $BB_1$ in its new position, relay contact $BD_1$ in the position shown and relay BC. Relay BC is thus energised and there follows the successive pulsing of relays BC and BD in the manner hereinbefore described, causing contact $BC_2$ of relay BC again to make and break alternately with contact 147. When relay contact $BC_2$ is in its new position, a circuit is completed between negative terminal 141 and positive terminal 153 comprising relay contacts $BC_2$, $BB_2$ and $BE_4$ in their new positions and the coil of uniselector UBB; when relay contact $BC_2$ returns to the position shown, this circuit is broken. Thus the alternate make and break of contact $BC_2$ causes pulsing of the coil of uniselector UBB and the wipers of uniselector UBB step over their respective contacts. In particular wipers 124, 125 and 126 step over the contacts of banks UBBb, UBBc and UBBd respectively. Since relay contact $BB_4$ is in its new position a circuit is alternately made and broken between terminals 151 and 152 as wiper 123 steps over the contacts of bank UBBL, comprising relay contact $BB_4$ in its new position, wiper 123 any one of the contacts of bank UBBL and the loudspeaker circuit shown generally at 131 (FIGURE 4a). Thus while the pressure switch 113 remains closed the typewriter operations present in any matrix column previously selected by the opening of vacuum switch 112, are successively scanned and a succession of distinctive notes of different frequencies are heard by the person, which helps him to identify at any given instant the typewriter operation which has been selected.

With relay contact $BB_3$ in its new position a circuit is completed between negative terminal 154 and positive terminal 155 comprising resistance 156 and capacitor 157 in parallel with relay BF. Relay BF is thus energised and changes over its four contacts $BF_1$, $BF_2$, $BF_3$ and $BF_4$.

Relay contacts $BF_1$, $BF_2$ and $BF_3$ in their new positions prepare for completion, when pressure switch 113 is opened, the circuits contained between terminals 154 and 158, 160 and 137 and 143 and 161 respectively. Relay contact $BF_4$ in its new position permanently breaks the circuit contained between terminals 134 and 135 and thus prevents pulsing of the coil of uniselector UBA if the vacuum switch 112 is inadvertently closed.

The letter "d" is typed in the following manner. The person closes the vacuum switch 112, and releases suction while the second note is emitted from the loudspeaker, at which instant wipers 118, 120 and 121 are in the positions indicated by 118', 120' and 121'. The pressure switch 113 is then closed, and opened after four notes have been emitted from the loudspeaker, at which instant wipers 122, 125 and 123 are in the positions indicated by 122', 125', and 123'. When the pressure switch is opened, the circuit between terminals 138 and 140 is broken and relay BB is immediately de-energised, On de-energisation of relay BB, relay contacts $BB_1$, $BB_2$, $BB_3$ and $BB_4$ return to the positions shown. The return of relay contact $BB_1$ to the position shown permanently breaks the circuits between terminals 143, 144 and 145 thus preventing further energisation of relays BC and BD. With relays BB and BC de-energised, their contacts $BB_2$ and $BC_2$ are in the positions shown and since relay BE remains energised for a short period in a manner to be described after opening of switch 113, thereby keeping its contact $BE_4$ over in its new position, the circuit between terminals 141 and 153 containing the coil of uniselector UBB is broken. Thus further stepping of the wipers of uniselector UBB is for a short period prevented.

The return of contact $BB_3$ to the position shown breaks the circuit between terminals 154 and 155, but relay BF remains energised for a short period of time due to the presence of the holding circuit comprising resistor 156 and capacitor 157. While relay BF remains energised a circuit is completed between terminals 154 and 158, comprising relay contact $BB_3$ in the position shown, relay contact $BF_1$ in its new position, wiper 120 in the position indicated by 120', wiper 125 in the position indicated by 125' and the electric circuit shown generally at 133. Circuit 133 is thus energised and the typewriter types the letter "d." There is a short delay while the typewriter operation is being performed, and at the end of the delay the coils of uniselectors UBA and UBB are repulsed in the manner to be described, and return their wipers to their "homed" positions.

Also while relay BF remains energised a circuit is completed between terminals 143 and 161 comprising relay contact $BB_1$ in the position shown, relay contact $BF_3$ in its new position and two parallel circuits, one containing relay BG and the other containing capacitor 162. Relay BG is thus energised and changes over its make-before-break contacts $BG_1$ and its contacts $BG_2$. On operation of contacts $BG_1$ the holding circuit for relay BE from terminal 163 is broken and replaced by one from terminal 160 through closed contact $BF_2$.

When finally relay BF is de-energised its four contacts $BF_1$, $BF_2$, $BF_3$ and $BF_4$ return to the positions shown. The return of contact $BF_1$ to the position shown breaks the circuit between terminals 154 and 158 thus de-energising circuit 133. The return of contact $BF_3$ to the position shown breaks the circuit between terminals 143 and 161, but relay BG remains energised for a short period of time due to the presence of the capacitor 162. The continued energisation of relay BG keeps its contact $BG_2$ in its new position, relay contact $BF_4$ having returned to the position shown, and thus prevents further pulsing of the coil of uniselector UBA if the vacuum switch 112 is inadvertently closed. The return of relay contact $BF_2$ to the position shown breaks the circuit between terminals 160 and 137 containing contacts $BG_1$ in their new positions. Relay BE is thus de-energised, and remains de-energised when relay BG is finally de-energised, since at that instant relay contact $BE_2$ is open. When relay BG is de-energised its contacts $BG_1$ and contacts $BG_2$ return to the position shown. With relay contact $BE_3$ in the position shown a circuit is completed between negative terminal 164 and positive terminal 142, comprising interrupter contacts 165, wiper 118 in the position indicated by 118', relay contact $BE_3$ and the coil of uniselector UBA. Thus the coil of uniselector UBA is continuously pulsed until wiper 118 steps on to contact 166, at which instant further pulsing of the coil is prevented; in this way the uniselector is "homed."

With relay contact $BE_4$ in the position shown a circuit is completed between negative terminal 167 and positive terminal 153, comprising interrupter contacts 168, wiper 122 in the position indicated by 122' relay contacts $BE_4$ and the coil of uniselector UBB. Thus the coil of uniselector UBB is continuously pulsed until wiper 122 steps on to contact 170 at which instant further pulsing of the coil of uniselector UBB is prevented; in this way the uniselector is "homed."

The operation of one form of control system has been described on the assumption that the person requires to type the lower case letter "d." If upper case typewriter operations are required to be performed such as the typing of the capital letter "D," then the person first selects and energises the typewriter operation marked "SHIFT" in the first column and third row of the matrix illustrated in FIGURE 3. Once "SHIFT" has been energised all subsequent typewriter operations will be upper case operations. "SHIFT" can only be cancelled on re-selection and re-energisation. The circuit controlling the "SHIFT" operation will now be described.

On opening of the pressure switch 113 after wipers 120 and 124 are disposed such that wiper 120 is on contact 1 of bank UBAb and wiper 124 is on contact 3 of bank UBBb, a circuit is completed between terminals 154 and 158 in the manner previously described. Latching relay BJ is thus energised and changes over its one contact $BJ_1$ from the position shown. A circuit is then completed between negative terminal 171 and positive terminal 172, and the typewriter shift operation is performed. When subsequently wipers 120 and 124 are returned to their "homed" positions the circuit between terminals 154, 158 is broken, but latching relay BJ remains in its operative position and is only returned to its non-operative position when the circuit between terminals 154 and 158 is re-completed.

It is to be realised that means other than a loudspeaker circuit may be used to indicate to the operator of the control system the particular matrix column or typewriter operation which at any instant has been selected, and that the loudspeaker circuit as hereinbefore described is only given by way of example.

In a modification of the embodiment of the present invention, holding circuits are provided for relays BA and BB, comprising further relay contacts $BA_6$, $BC_3$ and $BB_5$, $BC_4$ respectively (FIGURE 4A). In the modification, if switch 113 is opened while the wipers of uniselector UBB are between two contacts, relay BB, due to the presence of contacts $BB_5$ and $BC_4$, remains energised and thereby keeps its contact $BB_2$ over in the closed position and allows the energisation of the coil of uniselector UBB to continue until such time as contact $BC_2$ opens due to the de-energisation of relay BC. Without the presence of the holding circuit, the opening of switch 113 as hereinbefore described, has caused the wipers of uniselector UBB to come to rest between two contacts and as a result two typewriter circuits have been energised. The holding circuit $BA_6$, $BC_3$ for relay BA prevents two matrix columns being selected if switch 112 is opened when the wipers of uniselector UBA are between two contacts.

Figure 1B:
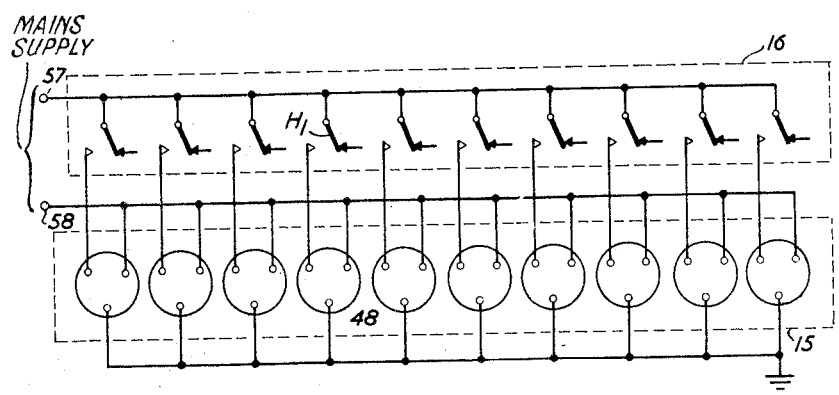
Figure 5:
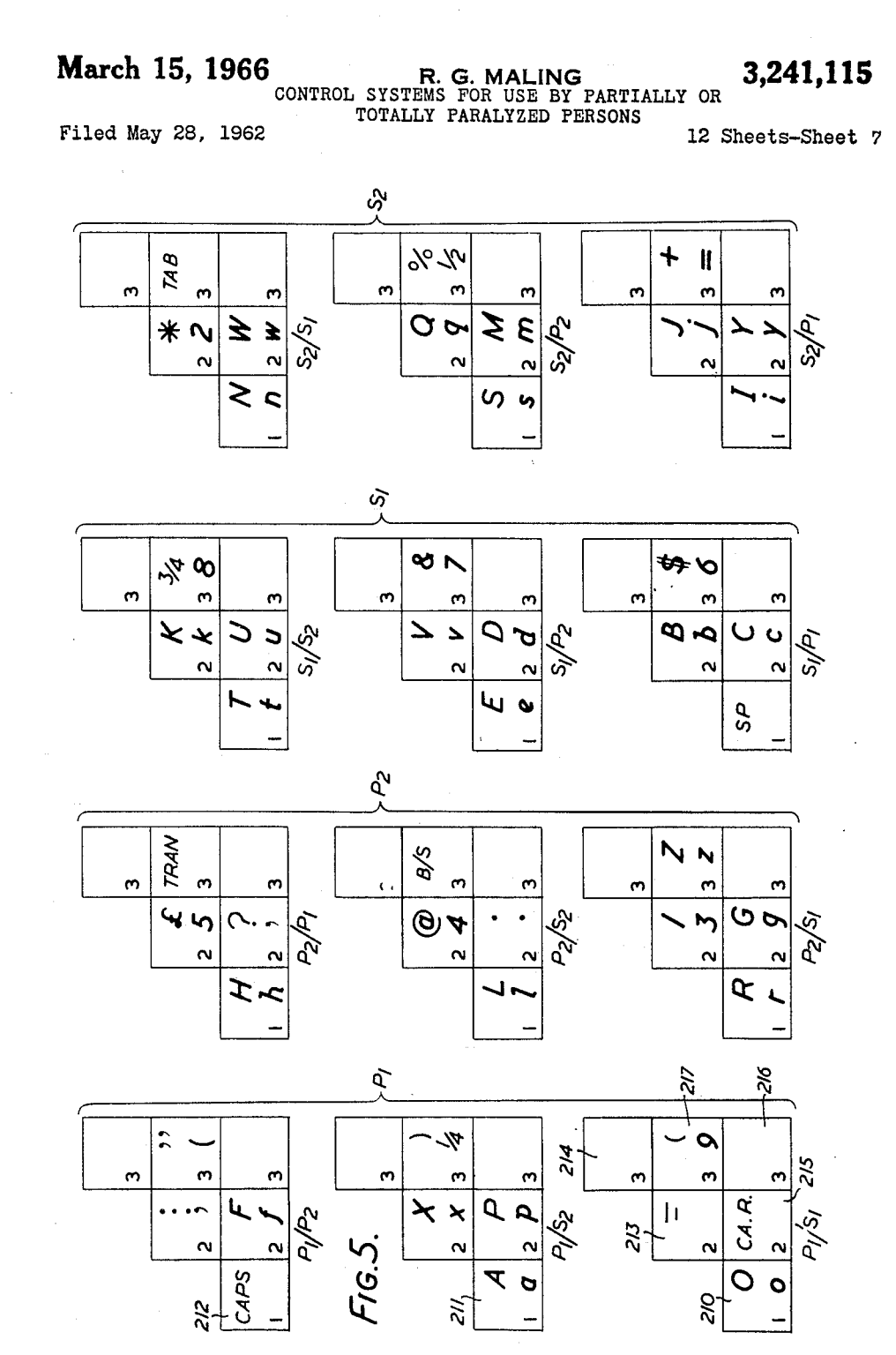

In FIGURE 5 the various typewriter operations are shown arranged in a set of four major matrices $P_1$, $P_2$, $S_1$, and $S_2$. Each of these major matrices is divided into three sub-matrices; for example the major matrix $P_1$ is divided into the sub-matrices $P_1/S_1$, $P_1/S_2$ and $P_1/P_2$. From FIGURE 5 it will be seen that each sub-matrix has six spaces and is therefore capable of having arranged therein six typewriter operations; however since there are only forty-seven typewriter operations and one non-typewriter operation over which it is desired to have control, each sub-matrix accommodates only four typewriter operations, the remaining two spaces in each sub-matrix being shown blank in FIGURE 5. The non-typewriter operation is that marked "TRAN" present in the sub-matrix $P_2/P_1$ of major matrix $P_2$. The space marked "TRAN" is associated with auxiliary circuits, not shown, which connect the control circuit of FIGURE 6 with that of FIGURE 1, and corresponds to the space marked "TRAN" in the sixth row and eighth column of FIGURE 3 hereinbefore referred to.

Any particular typewriter operation is selected by firstly operating a control switch to select one of the four major matrices. For the purposes of illustration, it will be assumed that the major matrix $P_1$ has been selected. The control circuit, when selecting the major matrix $P_1$, automatically and simultaneously selects the corresponding spaces 210, 211 and 212 of the sub-matrices $P_1/S_1$, $P_1/S_2$ and $P_1/P_2$ respectively. Continued operation of the control switch causes the spaces 213 and 214 of the sub-matrix $P_1/S_1$, and the corresponding spaces of the sub-matrices $P_1/S_2$ and $P_1/P_2$ to be simultaneously scanned. Cessation of operation of the control switch after the space 210 has been selected and before the space 213 has been selected, causes the control circuit to automatically scan the spaces 215 and 216 of the sub-matrix $P_1/S_1$ and the corresponding spaces of the sub-matrices $P_1/S_2$ and $P_1/P_2$. Similarly, if operation of the control switch ceases after the space 213 has been selected and before the space 214 has been selected the control circuit automatically selects the space 217 of the sub-matrix $P_1/S_1$ and the corresponding space of each of the sub-matrices $P_1/S_2$ and $P_1/P_2$. The required sub-matrix, and the required typewriter operation contained in a space of that sub-matrix, are simultaneously selected by operating a further control switch at the end of a specified delay following the cessation of operation of the first control switch. When the desired space has been selected, the typewriter operation associated with that space is automatically performed. Thus, to select and type the lower case letter "o" in the space 210 of the sub-matrix $P_1/S_1$, a first control switch is operated to select the major matrix $P_1$ thereby instantaneously selecting the spaces 210, 211 and 212 of the sub-matrices $P_1/S_1$, $P_1/S_2$ and $P_1/P_2$. Before the control circuit steps on to the space 213 of the sub-matrix $P_1/S_1$ and the corresponding spaces of the sub-matrices $P_1/S_2$ and $P_1/P_2$, the first control switch is opened. Finally, before the control circuit steps on to the space 215 of the sub-matrix $P_1/S_1$ and the corresponding spaces of the sub-matrices $P_1/S_2$ and $P_1/P_2$, a second control switch is operated to select and type the letter "o" of sub-matrix $P_1/S_1$.

In the control circuit of FIGURE 6, there are four control switches 218, 220, 221 and 222 which control relays CA, CB, CC and CD. The switches may be separate mechanically operated switches which may be combined into a single four way mechanically operated switch. Preferably however, and according to the present embodiment, they are sensitive air pressure and vacuum switches. Switches 218 and 220 are pressure switches, switch 218 being operated at a first low level of pressure ($P_1$) and switch 220 being operated at a second higher level of pressure ($P_2$). Switches 221 and 222 are vacuum switches, switch 221 being operated at a first low level of suction ($S_1$) and switch 222 being operated at a second higher level of suction ($S_2$). It will therefore be seen that operation of pressure switch 220 entails operation of pressure switch 218 and that operation of vacuum switch 222 entails operation of vacuum switch 221.

Figure 6B:
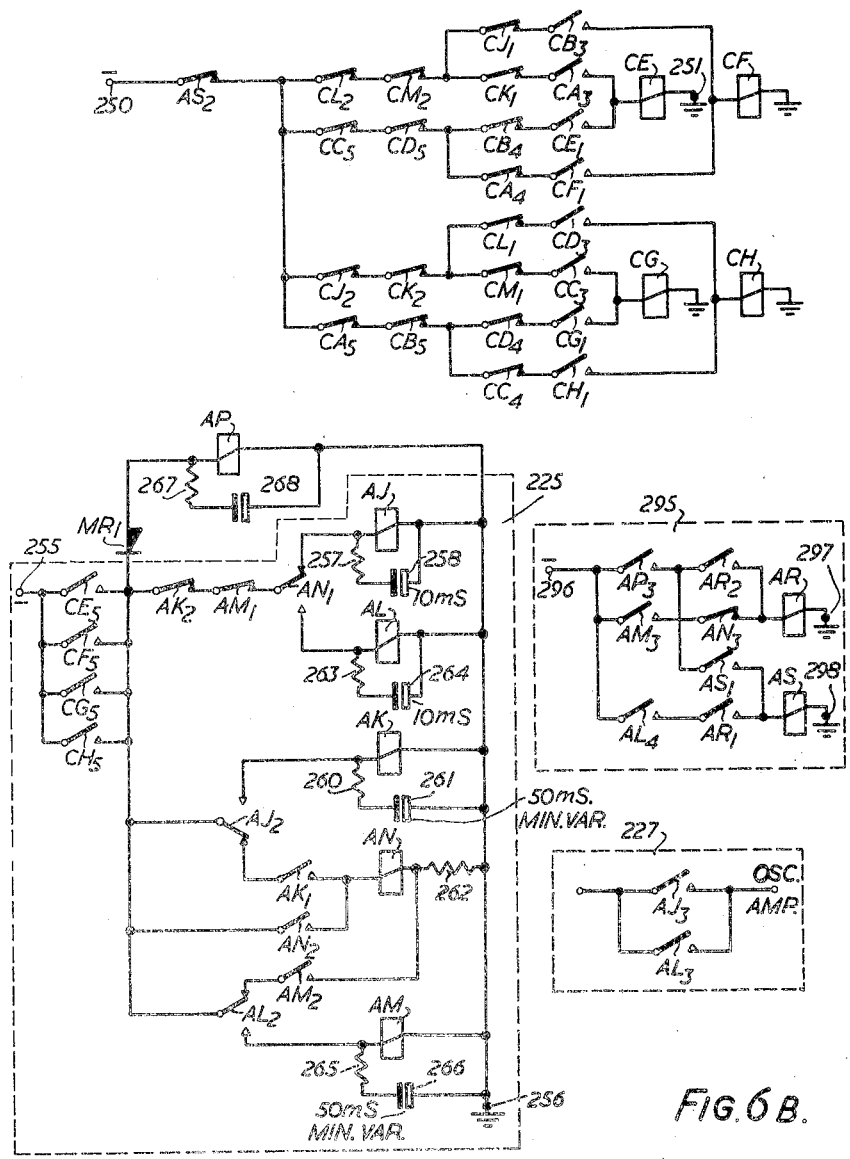
Figure 6B:
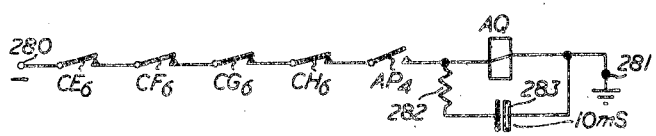
Figure 6C:
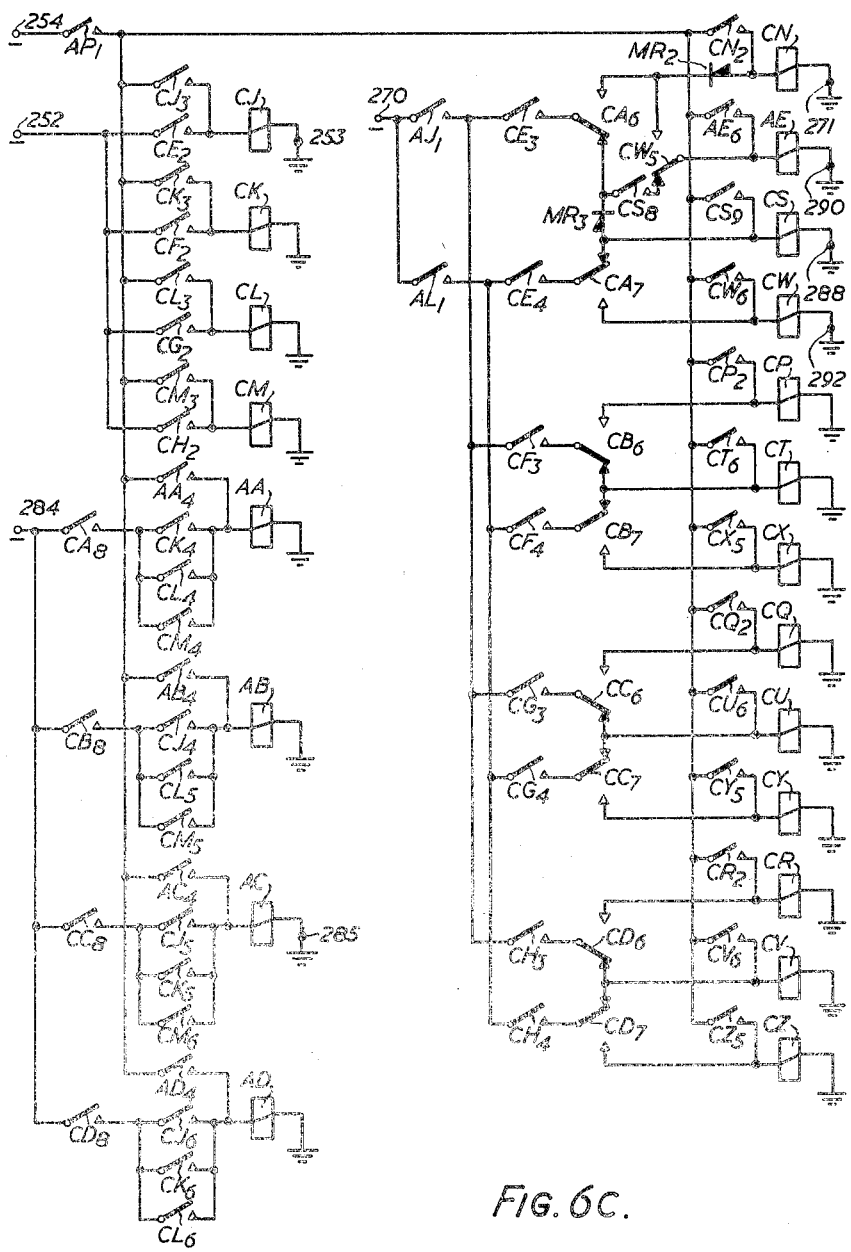

Relays CA, CB, CC and CD respectively control relays AA and CE; AB and CF; AC and CG; AD and CH (FIGURES 6C and 6B). Relays CE, CF, CG and CH respectively control relays CJ, CN, CS, CW and AE; CK, CP, CT and CX; CL, CQ, CU and CY; CM, CR, CV and CZ (FIGURE 6C). Combinations of these relays in de-energised or energised states causes selection and energisation of the typewriter operations shown in FIGURE 5. The circuit concerned with the energisation of the typewriter operations is shown at 223 in FIGURE 6D. This circuit comprises the circuits associated with the typewriter operations contained in the major matrices $P_1$, $P_2$, $S_1$ and $S_2$ and as is seen from FIGURES 6D and 6E, the paths associated with each of the typewriter operations are identified. A loudspeaker tuning circuit is shown generally at 224 FIGURE 6A and this circuit includes contacts of the relays CA, CB, CC and CD for the purpose to be described.

Figure 6D:
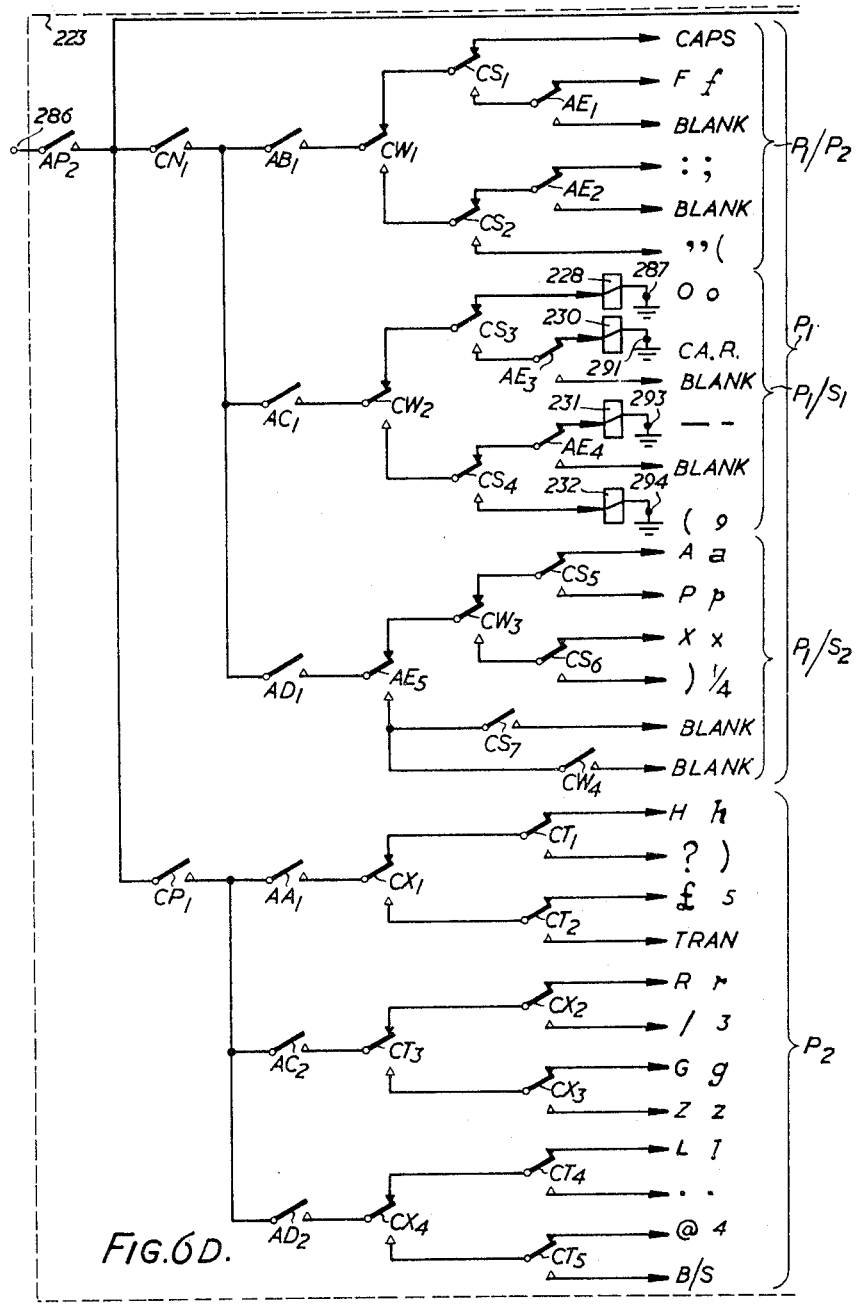
Figure 6E:
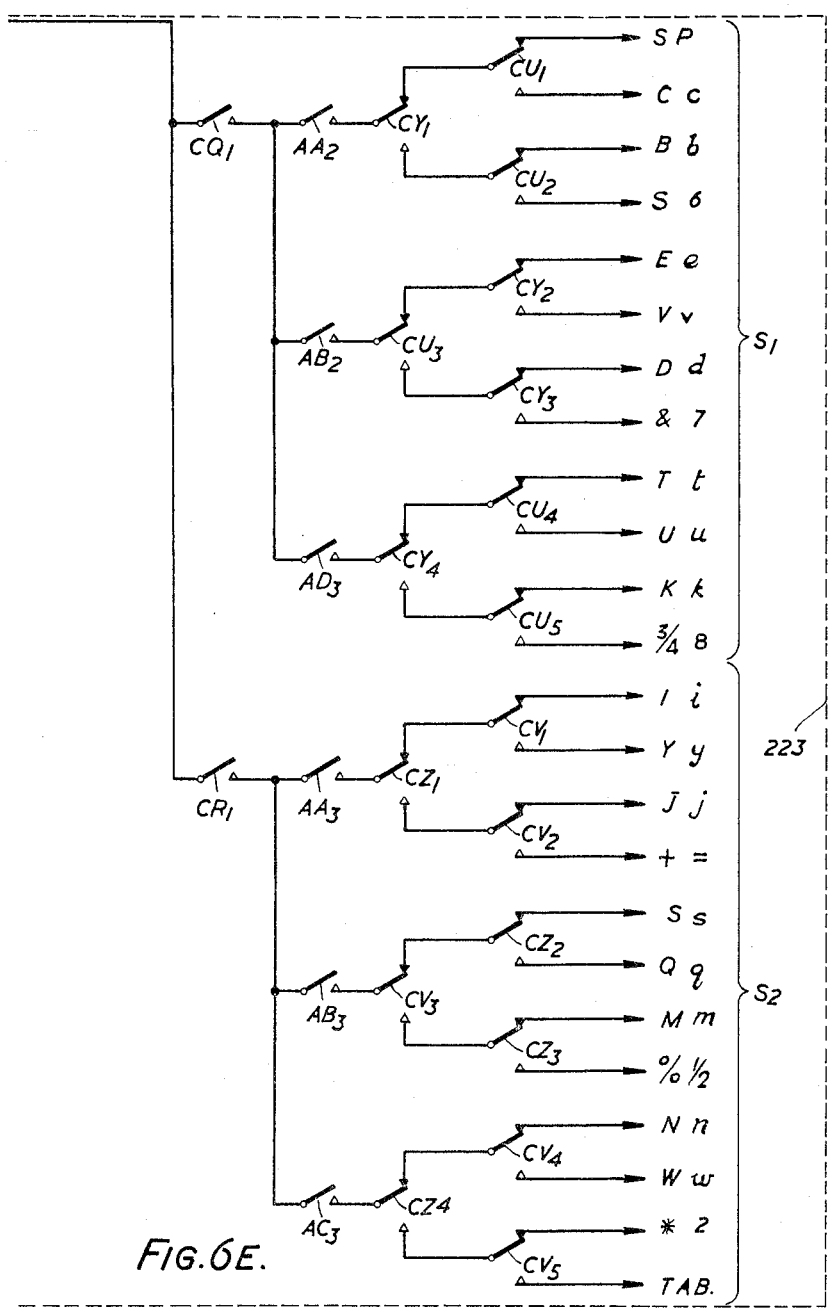

The general mode of operation of the circuit of FIGURES 6A and 6E is as follows. On the operation of any one of the control switches 218, 220, 221, 222 (FIGURE 6A), one of the relays CE, CF, CG, CH (FIGURE 6B) is energised. Energisation of one of those relays closes one of the corresponding relay contacts $CE_5$, $CF_5$, $CG_5$, $CH_5$. The contacts $CE_5$, $CF_5$, $CG_5$ and $CH_5$ are included in a flip-flop circuit shown generally at 225 (FIGURE 6B); thus the closure of any one of these contacts energises the flip-flop circuit 225 for the purpose to be hereinafter described. Closure of any one of these contacts also energises a relay AP (FIGURE 6B) arranged in parallel relationship with the flip-flop circuit 225. Relay AP has a contact $AP_2$ arranged in the circuit shown generally at 223, and it will be seen from FIGURE 6D that when the contact $AP_2$ is closed, the circuits associated with the major matrices $P_1$, $P_2$, $S_1$, and $S_2$ are prepared for subsequent energisation.

Energisation of the flip-flop circuit 225 causes successive pulsing of relays AJ and AL (FIGURE 6B) of that circuit and the contacts $AJ_1$ (FIGURE 6C) and $AL_1$ of these relays are alternatively opened and closed. The operation of these contacts together with the operation of one of the control switches 218, 220, 221, 222 causes the energisation of certain of the relays CN, AE, CS, CW, CP, CT, CX, CQ, CU, CY, CR, CV, CZ (FIGURE 6C). Which one of these relays is at any instant energised depends on the duration of operation of the flip-flop circuit 225 and on which of the control switches 218, 220, 221, 222 is operated. Energisation of any one of the relays CN, CP, CQ, CR causes any one of the corresponding contacts $CN_1$, $CP_1$, $CQ_1$, $CR_1$ (FIGURES 6D and 6E) to close. Any one of these contacts when closed selects, for subsequent energisation, the circuits of one of the major matrices $P_1$, $P_2$, $S_1$, $S_2$. For example, the closure of contact $CN_1$ prepares the circuits for major matrix $P_1$ for subsequent energisation.

When a major matrix has been selected, the flip-flop circuit 225 continues to pulse the relays AJ and AL, either on the continuation of operation of the first control switch chosen to give the required major matrix, or after the cessation of operation of that control switch. The energisation of the flip-flop circuit 225 causes certain of the typewriter operations present in the three sub-matrices of the selected major matrix to be scanned. The particular typewriter operations which are scanned are determined, as has been described, by the duration of operation of the first control switch and, for the purpose of illustration, the number of flip-flop pulses associated with each typewriter operation are indicated in the bottom left hand corners of the spaces of the sub-matrices shown in FIGURE 5. Again, as hereinbefore described, operation of a second control switch effects the selection of the required sub-matrix and the operation of the desired typewriter operation, the relays which, when energised, effect the selection of a particular sub-matrix being relays AA, AB, AC and AD (FIGURE 6C).

Thus the contacts $AB_1$, $AC_1$ and $AD_1$ (FIGURE 6B) of these relays are associated with the selection of the sub-matrices of the major matrix $P_1$, the contacts $AA_1$, $AC_2$ and $AD_2$ (FIGURE 6D) of the relays are associated with the selection of the sub-matrices of major matrix $P_2$, the contacts $AA_2$, $AB_2$ and $AD_3$ (FIGURE 6E) of the relays are associated with the selection of the sub-matrices of major matrix $S_1$ and the contacts $AA_3$, $AB_3$ and $AC_3$ (FIGURE 6E) of the relays are associated with the selection of the sub-matrices of the major matrix $S_2$.

The selection of a particular typewriter operation within the chosen sub-matrix is determined by the selective energisation of the relays CS, CW, AE, CT, CX, CU, CY, CV, CZ. Thus, the typewriter operations contained the sub-matrices $P_1/P_2$; $P_1/S_1$; $P_1/S_2$ are respectively selected by the selective operation of the relay contacts $CS_1$, $CW_1$, $CS_2$, $AE_2$, $AE_1$; $CS_3$, $CW_2$, $CS_4$, $AE_4$, $AE_3$; $CS_5$, $CW_3$, $AE_5$, $CS_6$ (FIGURE 6D). From the circuit shown generally at 223 (FIGURE 6D), it is seen than the circuits of the sub-matrices $P_1/P_2$, $P_1/S_1$ and $P_1/S_2$ are each adapted to be connected to six typewriter operations. Since however, as already described, only four typewriter operations are required to be accommodated by each sub-matrix, the leads of two of the circuits of each of the sub-matrices $P_1/P_2$, $P_1/S_1$ and $P_1/S_2$ are shown as "BLANK" in the circuit 223. The two "BLANK" leads of sub-matrix $P_1/S_2$ are shown connected to two contacts $CS_7$ and $CW_4$ (FIGURE 6D), not previously mentioned, of relays CS and CW. It will be seen that all the leads of the sub-matrices of the major matrices $P_2$, $S_1$, and $S_2$ are shown as being associated with a typewriter operation. The relay contacts of the sub-matrices of the major matrices $P_2$, $S_1$, and $S_2$ are arranged in similar manner to the relay contacts of the sub-matrices of major matrix $P_1$ and will not therefore be described.

Once a typewriter operation, present in a particular space of a sub-matrix, is selected, a unique circuit is completed to the typewriter control circuit associated with the selected typewriter operation and that typewriter operation is performed. After a short delay, all selected relays are de-energised and the circuits are ready for the next selection.

At all times when the control mechanism is in use, but not actually operating, a low-level medium-pitch note is emitted by the loudspeaker circuit (not shown), the pitch being controlled by the switched capacitors shown generally at 226 (FIGURE 6A), these capacitors being included in the loudspeaker tuning circuit shown generally at 224 (FIGURE 6A). Closure of any one of the control switches causes a change in the pitch of the emitted note. These pitch changes enable the operator to easily identify the particular control switch which has been closed. The operator is further assisted by the fact that the selected note is intensified, by means of the amplifier circuit shown generally at 227 (FIGURE 6B), for the duration of each pulse generated by the flip-flop circuit 225 (FIGURE 6B).

The operation of the control system will now be considered in detail, it being assumed that a means of control is required for a partially or totally paralysed person who is only capable of producing, in the mouth, pressures a little above and a little below atmospheric pressure. It will further be assumed, for the purposes of illustration, that such a person requires to perform the lower case typewriter operations contained in the sub-matrix $P_1/S_1$ of the major matrix $P_1$ illustrated in FIGURE 5. The electric circuits required to be energised to perform these operations are shown generally at 228, 230, 231 and 232, each circuit being a part of the circuit 223 of FIGURE 6D. Energisation of any one of the circuits 228, 231 and 232 (FIGURE 6D) respectively causes any one of the lower case characters "o," "_," "9" to be typed, and energisation of the circuit 230 causes the operation "CA.R" (carriage return) to be performed.

The person is linked to the control system by means of a piece of tubing one end of which is attached to a suitable mouthpiece. The other end of the tubing is forked to form four arms, two of the arms each being attached to the pressure switches 218, 220, and the remaining arms each being attached to the vacuum switches 221, 222. The control system is plugged into the mains supply and a circuit then exists between negative terminal 233 and positive terminal 234 (FIGURE 6A) comprising relay contact $AQ_1$ in the position shown, contacts 235 and 236 of vacuum switch 221, contacts 237 and 238 of pressure switch 218, relay contact $AP_5$ in the position shown, relay AT and the resistor 240 and capacitor 241 arranged in parallel with relay AT. Relay AT is thus energised and changes over its two contacts $AT_1$ and $AT_2$ from the positions shown for the purpose to be hereinafter described. To select the major matrix $P_1$, the operator closes the contacts 237 and 242 of pressure switch 218 by applying to the mouthpiece a pressure which is of the order of 3 cm. water gauge above the atmospheric pressure. The closure of contacts 237 and 242 breaks the circuit between terminals 233 and 234 thereby causing relay AT to be de-energised, the presence of capacitor 241 preventing the immediate de-energisation of this relay. When relay AT is finally de-energised, its contacts $AT_1$ and $AT_2$ return to the positions shown and a circuit is completed between negative terminal 233 and positive terminal 243 comprising switch contacts 237, 242, relay contacts $AT_1$, $CC_2$ and $CD_2$ in the positions shown, switch contacts 244, 245 of pressure switch 220, relay contact $CB_1$ in the position shown, relay CA and resistor 246 and capacitor 247 arranged in parallel with relay CA. Relay CA is thus energised and changes over its nine contacts $CA_{1-9}$ from the positions shown. With contact $CA_9$ (FIGURE 6A) in its new position, the pitch of the audible note hereinbefore referred to is raised by one "step" by the removal of capacitor 248 from the loudspeaker tuning circuit 224. With relay contact $CA_3$ in its new position, a circuit is completed between negative terminal 250 and positive terminal 251 comprising relay contacts $AS_2$, $CL_2$, $CM_2$ and $CK_1$ in the positions shown, relay contact $CA_3$ in its new position, and relay CE (FIGURE 6B). Relay CE is thus energised and changes over its six contacts $CE_{1-6}$ from the positions shown. Contact $CE_1$ in its new position completes a holding circuit for relay CE between terminals 250 and 251 comprising relay contacts $AS_3$, $CC_5$, $CD_5$, $CB_4$ in the positions shown relay contact $CE_1$ in its new position and relay CE. Relay contact $CE_2$ in its new position completes a circuit from negative terminal 252 to positive terminal 253 comprising relay CJ (FIGURE 6C). Relay CJ is thus energised and causes its six contacts $CJ_{1-6}$ to change over from the positions shown. Relay contact $CJ_3$ in its new position prepares a holding circuit for relay CJ contained between negative terminal 254 and positive terminal 253, completion only being attained when relay contact $AP_1$ is changed over from the position shown. Relay contact $CE_5$ in its new position energises the flip-flop circuit shown generally at 225 (FIGURE 6B) and contained between the negative and positive terminals 255 and 256 respectively. The operation of the flip-flop circuit 225 will now be described.

When relay contact $CE_5$ is changed over from the position shown due to the energisation of relay CE, a circuit is completed between negative terminal 255 and positive terminal 256 comprising relay contact $CE_5$ in its new position, relay contacts $AK_2$, $AM_1$ and $AN_1$ in the positions shown, relay AJ and resistor 257 and capacitor 258 arranged in parallel across relay AJ. Relay AJ is thus energised and changes over its three contacts $AJ_{1-3}$ from the positions shown. Contact $AJ_2$ in its new position completes a circuit between terminals 255 and 256, comprising relay contacts $CE_5$ and $AJ_2$ in their new positions, relay AK and resistor 260 and capacitor 261 arranged in parallel across relay AK. Relay AK is thus energised and changes over its two contacts $AK_{1-2}$ from the positions shown. When relay contact $AK_2$ changes over from the position shown, the circuit between terminals 255 and 256 which includes relay AJ is broken, the presence of the capacitor 258 preventing immediate de-energisation of relay AJ. When relay AJ is finally de-energised, relay contact $AJ_2$ returns to the position shown and firstly a circuit is completed between terminals 255 and 256 comprising relay contact $CE_5$ in its new position, relay contact $AJ_2$ in the position shown, relay contact $AK_1$ in its new position, relay AN and resistor 262. Thus relay AN is energised and changes over its three contacts $AN_{1-3}$ from the positions shown. Relay contact $AN_2$ in its new position completes a holding circuit for relay AN between terminals 255 and 256 comprising relay contacts $CE_5$ and $AN_2$ in their new positions, relay AN and resistor 262. Secondly, when relay contact $AJ_2$ returns to the position shown, the circuit between terminals 255 and 256 including relay AK is broken, however the presence of capacitor 261 prevents immediate de-energisation of relay AK. When relay AK is finally de-energised, relay contact $AK_2$, now in the position shown, completes a circuit between terminals 255 and 256 comprising relay contact $CE_5$ in its new position, relay contacts $AK_2$ and $AM_1$ in the positions shown, relay contact $AN_1$ in its new position, relay AL and resistor 263 and capacitor 264 arranged in parallel across relay AL. Relay AL is thus energised and changes over its four contacts $AL_{1-4}$ from the positions shown. Relay contact $AL_2$ in its new position completes a circuit between terminals 255 and 256 comprising relay contacts $CE_5$ and $AL_2$ in their new positions, relay AM and resistor 265 and capacitor 266 arranged in parallel across relay AM. Relay AM is thus energised and changes over its three contacts $AM_{1-3}$ from the positions shown. Relay contact $AM_1$ in changing over to its new position, breaks the circuit between terminals 255 and 256 which includes relay AL, however relay AL remains energised for a short period of time due to the presence of capacitor 264. When relay AL is finally de-energised, relay contact $AL_2$ returns to the position shown and firstly completes a circuit between terminals 255 and 256 comprising relay contact $CE_5$ in its new position, relay contact $AL_2$ in the position shown, relay contact $AM_2$ in its new position and resistor 262. Thus, on the de-energisation of relay AL, the supply voltage from negative terminal 255 is applied equally to each side of relay AN which therefore de-energises. Secondly, the return of relay contact $AL_2$ to the position shown breaks the circuit between terminals 255 and 256 which includes relay AM, however the presence of capacitor 266 prevents the immediate de-energisation of relay AM. When relay AM is finally de-energised, relay contact $AM_1$ returns to the position shown thereby remaking the circuit which includes relay AJ and which has been previously described. Thus it is seen that the energisation of the flip-flop circuit shown generally at 225 causes relays AJ, AK, AL, AM and AN to operate continuously in the sequence AJ—on, AK—on, AJ—off, AN—on, AK—off, AL—on, AM—on, AL—off, AN—off, AM—off, pulse outputs being taken from relays AJ and AL. The duration of the pulses is determined by the capacitances of the capacitors 258 and 264; the duration of the pulse intervals is determined by the capacitances of the capacitors 261 and 266, and the pulsing rate is dependent on the capacitance of all four capacitors 258, 264, 261 and 266. It will be realised that the resistors hereinbefore described and shown in series with these capacitors serve merely to limit the surge currents through the relay contacts. Relay contacts $AJ_3$ and $AL_3$ are used in the amplifier circuit 227 to intensify the audible signal for the duration of each pulse, as previously described.

Simultaneously with the energisation of the flip-flop circuit 225, the closure of relay contact $CE_5$ completes a circuit between terminals 255 and 256 comprising contact $CE_5$ in its new position, rectifier $MR_1$, relay AP and a resistor 267 and capacitor 268 arranged in parallel across the relay AP. Relay AP is thus energised and changes over its five contacts $AP_{1-5}$ from the positions shown. Relay contact $AP_1$ (FIGURE 6C) in its new position completes the holding circuit, hereinbefore mentioned, for relay CJ and relay contact $AP_2$ (FIGURE 6D) in its new position prepares the circuits associated with the major matrices $P_1$, $P_2$, $P_3$ and $P_4$ for sebsequent energisation.

On the first pulse of the flip-flop circuit 225 after energisation of relay CE, a circuit is completed between negative terminal 270 and positive terminal 271 (FIGURE 6C) comprising relay contacts $AJ_1$, $CE_3$ and $CA_6$ in their new positions, rectifier $MR_2$ and relay CN. Rectifier $MR_2$ is arranged to permit current to flow from positive terminal 271 to negative terminal 270. Relay CN is thus energised and changes over its two contacts $CN_1$ and $CN_2$ from the positions shown. Relay contact $CN_2$ in its new position completes a holding circuit for relay CN between negative terminal 254 and positive terminal 271 comprising the relay contacts $AP_1$ and $CN_2$ in their new positions. Relay contact $CN_1$ in its new position prepares the circuits associated with the major matrix $P_1$ for subsequent energisation thus the selection of the major matrix $P_1$ is completed.

In order to select and type the lower case letter "o" of sub-matrix $P_1/S_1$, the person must, before the commencement of the second pulse from the flip-flop circuit 225, open the contacts 237, 242, of pressure switch 218 by releasing the pressure applied thereto, and must close the contacts 235 and 272 of vacuum switch 221 by applying to the mouthpiece a pressure which is of the order of 3 cm. water gauge below the atmospheric pressure.

The opening of the contacts 237, 242 of pressure switch 218 breaks the circuit between terminals 233, 243 including relay CA. The presence of capacitor 247 prevents immediate de-energization of relay CA, however when relay CA is finally de-energized, its nine contacts $CA_{1-9}$ return to the positions shown. In particular, relay contact $CA_9$ in the position shown lowers the pitch of the audible tone to the normal medium pitch. The closure of the contacts 235 and 272 of vacuum switch 221 completes a circuit between negative terminal 233 and positive terminal 273 comprising relay contact $AQ_1$ in the position shown, contacts 235 and 272 of vacuum switch 221, relay contacts $AT_2$, $CA_2$ and $CB_2$ in the positions shown, contacts 274 and 275 of vacuum switch 222, relay contact $CD_1$ in the position shown, relay CC and resistor 276 and capacitor 277 arranged in parallel across relay CC. Thus relay CC is energised and changes over its nine contacts $CC_{1-9}$ from the positions shown.

With relay contact $CC_9$ in its new position, the pitch of the audible note is lowered one "step" by the addition of the capacitor 278 in the loudspeaker tuning circuit 224. In moving to its new position, relay contact $CC_5$ breaks the holding circuit between terminals 250 and 251 for relay CE thereby causing the de-energisation of relay CE and the return of its six contacts $CE_{1-6}$ to the positions shown. The return of relay contact $CE_5$ to the position shown breaks the circuit between terminals 255 and 256 containing the flip-flop circuit 225 and the relay AP. Thus the flip-flop circuit 225 is de-energised and ceases to operate, but relay AP remains energised for a short period of time due to the presence of capacitor 268. The rectifier $MR_1$ is inserted in series with relay AP to prevent capacitor 268 discharging through the flip-flop circuit 225, more particularly through relay AJ, possibly causing this to pulse briefly.

The return of relay contact $CE_6$ (FIGURE 6B) to the position shown completes a circuit between negative terminals 280 and positive terminal 281 comprising relay contacts $CE_6$, $CF_6$, $CG_6$ and $CH_6$ in the positions shown, relay contact $AP_4$ in its new position, relay AQ and resistor 282 and capacitor 283 arranged in parallel with relay AQ. Thus relay AQ is energised and changes over its single contact $AQ_1$ from the position shown. It will therefore be seen that continued operation of the vacuum switch 221, during the time that relay AP remains energised, can have no effect on the operation of the control circuit. Relay contact $CC_8$ in its new position completes a circuit between negative terminal 284 and positive terminal 285 comprising relay contacts $CC_8$ and $CJ_5$ in their new positions and relay AC (FIGURE 6E). Relay AC is thus energised and changes over its four contacts $AC_{1-4}$ from the positions shown. Relay contact $AC_4$ in its new position completes a holding circuit for relay AC between terminals 254 and 285 comprising relay contacts $AP_1$ and $AC_4$ in their new positions and relay AC. Relay contact $AC_1$ in its new position prepares the circuits associated with the sub-matrix $P_1/S_1$ for subsequent energisation, thus the selection of the sub-matrix $P_1/S_1$ is completed.

With relay contact $AC_1$ (FIGURE 6D) in its new position, a circuit is completed between negative terminal 286 and positive terminal 287 comprising relay contacts $AP_2$, $CN_1$ and $AC_1$ in their new positions, relay contacts $CW_2$ and $CS_3$ in the positions shown and the electric circuit 228. The electric circuit 228 is thus energised, the lower case letter "o" is typed and the typewriter carriage moved to the next position.

When relay AP is finally de-energised, its relay contacts $AP_{1-5}$ returns to the positions shown. Relay contact $AP_1$ in returning to the position shown breaks the holding circuits between terminals 254 and 271, 254 and 253 and 254 and 285. Thus relays CN, CJ and AC are respectively de-energised and return their contacts to the positions shown. Relay contact $AP_2$ in returning to the position shown breaks the circuit comprising the major matrices $P_1$, $P_2$, $S_1$ and $S_2$. When relay contact $AP_4$ returns to the position shown, it breaks the circuit between terminals 280 and 281 which includes relay AQ. The presence of the capacitor 283 prevents relay AQ from de-energising immediately, however when relay AQ is finally de-energised, its single contact $AQ_1$ restores the supply circuit to the pressure and vacuum switches 218, 220, 221 and 222. Thus, if all four switches are un-operated, the circuit between terminals 233 and 234 including relay AT is again completed and relay AT is re-energised.

In order to select and operate the typewriter operation "CA.R" of sub-matrix $P_1/S_1$ (FIGURE 6D), the person must keep the contacts 237, 242 of pressure switch 218 closed for the first pulse of the flip-flop circuit 225, but must open the contacts of the pressure switch 218 before the commencement of the second pulse of the flip-flop circuit. The person must then keep the contacts of the pressure switch 218 open during the second pulse of the flip-flop circuit and must finally, before the commencement of the third pulse of the flip-flop circuit, close the contacts 235, 272 of vacuum switch 221.

As has been described, the opening of the contacts 237, 242 of pressure switch 218 effects the de-energisation of relay CA, the de-energisation being delayed by the presence of capacitor 247. On the de-energisation of relay $CA_1$ relay contact $CA_3$ returns to the position shown, but relay CE remains energised due to the presence of the holding circuit thereof previously described. Thus relay contact $CE_5$ remains in its new position thereby maintaining the energisation of the flip-flop circuit 225. At the commencement of the second pulse of the flip-flop circuit, relay contact $AJ_1$ is in the position shown and relay contact $AL_1$ has changed over from the position shown. Thus, during the second pulse of the flip-flop circuit, a circuit is completed between negative terminal 270 and positive terminal 288 comprising relay contacts $AL_1$ and $CE_4$ in their new positions, relay contact $CA_7$ in the position shown and relay CS (FIGURE 6C). Relay CS is thus energised and changes over its nine contacts $CS_{1-9}$ from the positions shown. Relay contact $CS_9$ in its new position completes a holding circuit for relay CS between terminals 254 and 288 comprising relay contacts $AP_1$ and $CS_9$. It will be realised that, although relay contact $CS_8$ is changed over from the position shown, relay AE remains de-energised due to the presence of rectifier $MR_3$ which is arranged to prevent current flow between positive terminal 290 and negative terminal 270. The closure of the contacts 235 and 272 of vacuum switch 221, as hereinbefore described, prevents further pulsing of the flip-flop circuit 225 and causes the energisation of relay AC. Thus, a circuit is completed between negative terminals 286 and positive terminal 291 comprising relay contacts $AP_2$, $CN_1$ and $AC_1$ in their new positions, relay contact $CW_2$ in the position shown, relay contact $CS_3$ in its new position and the electric circuit 230. The electric circuit 230 (FIGURE 6D) is thus energised and the typewriter operation referred to as "CA.R" is performed.

In order to select and type the lower case character "—" of sub-matrix $P_1/S_1$ (FIGURE 6D), the person must keep the contacts 237, 242 of pressure switch 218 closed for two pulses of the flip-flop circuit 225, but must open the contacts of the pressure switch 218 and close the contacts 235, 272 of the vacuum switch 221 before the commencement of the third pulse of the flip-flop circuit.

During the second pulse of the flip-flop circuit with contacts 237, 242 of the pressure switch 218 closed, relays CA, CE and AL are energised and their respective contacts $CA_7$, $CE_4$ and $AL_1$ are changed over from the positions shown. Thus, a circuit is completed between negative terminal 270 and positive terminal 292, comprising relay contacts $AL_1$, $CE_4$, and $CA_7$ in their new positions and relay CW. Relay CW (FIGURE 6C) is therefore energised and changes over its six contacts $CW_{1-6}$ from the positions shown. Relay contact $CW_6$ in its new position completes a holding circuit for relay CW between terminals 254 and 292 comprising relay contacts $AP_1$ and $CW_6$ in their new positions. The closure of the contacts 235, 272 of the vacuum switch 221, as hereinbefore described, causes the de-energisation of the relay CE and the flip-flop circuit 225 and the energisation of relay AC. Thus, a circuit is completed between negative terminal 286 and positive terminal 293 comprising relay contacts $AP_2$, $CN_1$, $AC_1$ and $CW_2$ in their new positions, relay contacts $CS_4$ and $AE_4$ in the positions shown and the electric circuit 231 (FIGURE 6D). The electric circuit 231 is thus energised and the lower case character "-" is typed. It will be realised from the previous description of the typing of the lower case letter "o" that during the first pulse of the flip-flop circuit when the contacts of pressure switch 218 are closed, relay CN becomes energised but relays CS and AE do not become energised, thus, during the second pulse of the flip-flop circuit the contacts $CS_4$ and $AE_4$ of these relays are in the positions shown as described above.

In order to select and type the lower case number "9" of sub-matrix $P_1/S_1$ (FIGURE 6D), the person must keep the contacts 237, 242 of pressure switch 218 closed for two pulses of the flip-flop circuit 225 and must open the contacts of pressure switch 218 before the commencement of the third pulse of the flip-flop circuit. The person must then allow the flip-flop circuit to complete a third pulse and finally must close the contacts 235, 272 of the vacuum switch 221 before the commencement of the fourth pulse of the flip-flop circuit.

As has been described, the closure of the contacts of the pressure switch 218 for two pulses of the flip-flop circuit effects the energisation of relays AP, CN, and CW, thus the contacts $AP_2$, $CN_1$, and $CW_2$ of these relays are changed over from the positions shown. During the third pulse from the flip-flop circuit with the contacts of pressure switch 218 open and when relay CA is de-energised, a circuit is completed between negative terminal 270 and positive terminal 288 comprising relay contacts $AJ_1$ and $CE_3$ in their new positions, relay contact $CA_6$ in the position shown, rectifier $MR_3$ and relay CS. It will be appreciated that rectifier $MR_3$ is so arranged that current can pass from positive terminal 288 to negative terminal 270 thereby causing relay CS to be energised. When relay CS is energised, its nine contacts $CS_{1-9}$ change over from the position shown and in particular its contact $CS_9$ completes a holding circuit between terminals 254 and 288 as previously described. It will be realised that, since relay CW is energised, its contacts $CW_5$ is changed over from the position shown and therefore prevents relay AE from becoming energised when relay CS changes over its contact $CS_8$ from the position shown. The rectifier $MR_2$ is inserted to prevent energisation of relay AE from the holding supply to relay CN which is already energised, i.e., a circuit exists from negative terminal 254 to positive terminal 290 comprising relay contacts $AP_1$ and $CN_2$ in their new positions, rectifier $MR_2$, contact $CW_5$ in its new position and relay AE. Rectifier $MR_2$ is connected so that current cannot flow in this circuit. Finally, closure of the contacts of the vacuum switch 221 causes the energisation of relay AC as hereinbefore described and thus a circuit is completed between negative terminal 286 and positive terminal 294 comprising relay contacts $AP_2$, $CH_1$, $AC_1$, $CW_2$ and $CS_4$ in their new positions and the electric circuit 232 (FIGURE 6D). The electric circuit 232 is thus energised and the lower case number "9" is typed.

The operation of the typewriter control system has been described on the assumption that the person is required to perform lower case typewriter operations. If upper case typewriter operations are to be performed, such as the typing of the capital letter "O," then the person first selects and energises the typewriter operation marked "CAPS" in space 212 of sub-matrix $P_1/P_2$ of major matrix $P_1$ (FIGURE 5). Once "CAPS" has been energised, all subsequent typewriter operations will be upper case operations. "CAPS" can only be cancelled by reselection and reenergisation.

For the sake of completeness the method of selecting the spaces 214 and 216 of sub-matrix $P_1/S_1$ (FIGURE 5) will now be outlined although, as has been explained, no typewriter operation will be energised as a result of such selections. To select space 214, the contacts of pressure switch 218 must be closed for three pulses of the flip-flop circuit and then, before the commencement of the fourth pulse, these contacts must be opened and the contacts of vacuum switch 221 must be closed. During the second pulse of the flip-flop circuit relay CW (FIGURE 6C) is energised, thus changing over its contact $CW_5$ from the position shown. During the third pulse of the flip-flop circuit a circuit is completed between terminals 270 and 290 comprising relay contacts $AJ_1$, $CE_3$, $CA_6$ and $CW_5$ in their new positions and relay AE (FIGURE 6B). Thus relay AE is energized and changes over its contact $AE_4$ which is associated with the circuits of sub-matrix $P_1/S_1$, from the position shown. On the closure of the contacts of vacuum switch 221, relay contact $AC_1$ changes over from the position shown as hereinbefore described, and thus a circuit is completed comprising relay contact $AP_2$, $CN_1$, $AC_1$, and $CW_2$ (FIGURE 6D) in their new positions, relay contact $CS_4$ in the position shown and relay contact $AE_4$ in its new position which circuit provides means for energising any electric circuit which may be associated with the space 214.

To select space 216, the contacts of pressure switch 218 must be closed for one pulse of the flip-flop circuit and then, before the commencement of the second pulse, these contacts must be opened. Space 216 is finally selected by closing the contacts of vacuum switch 221 after two further pulses of the flip-flop circuit and before commencement of the fourth pulse thereof. From the previous description of the control circuit, it will be remembered that, during the second pulse of the flip-flop circuit with relay CA de-energised, a circuit is completed which effects the energisation of relay CS. Thus during the third pulse of the flip-flop circuit with relay CA de-energised, a circuit is completed between terminals 270 and 290 comprising relay contacts $AJ_1$ and $CE_3$ in their new positions, relay contact $CA_6$ in the position shown, relay contact $CS_8$ in its new position, relay contact $CW_5$ in the position shown and relay AE. Thus relay AE is energised and changes over its contact $AE_3$, which is associated with the circuits of sub-matrix $P_1/S_1$, from the position shown. On the closure of the contacts of vacuum switch 221, relay contact $AC_1$ changes over from the position shown as hereinbefore described, and thus a circuit is completed comprising relay contacts $AP_2$, $CN_1$ and $AC_1$ in their new positions, relay contact $CW_2$ in the position shown and relay contacts $CS_3$ and $AE_3$ in their new positions, which circuit provides means for energising any electric circuit which may be associated with the space 216. These additional circuits are provided for use with certain typewriters which have more than 48 functions and may be added to any or all of the major matrices if required, to give a total of 72 unique outputs.

An additional facility provided for the convenience of the operator is an automatic cancellation unit which is shown generally at 295 (FIGURE 6B). All typewriter operations are performed with three or less pulses from the flip-flop circuit, if however this circuit remains energised for four pulses, all selections are cancelled and the control system is returned to the starting condition. The operation of the automatic cancellation unit will now be described in detail, it being assumed that the operator commences, as hereinbefore described, to select the typewriter character ".", but maintains the original pressure at the mouthpiece beyond the end of the second flip-flop pulse.

During the second flip-flop pulse, relays CA, CE, CJ, CN, CW, AL, AM, AN, and AP are energised. Relay AN is de-energised after the completion of the second flip-flop pulse as hereinbefore described, and a circuit is completed between negative terminal 296 and positive terminal 297 comprising relay contact $AM_3$ in its new position, relay contact $AN_3$ in the position shown and relay AR. Thus relay AR is energised and causes its two contacts $AR_{1-2}$ to change over from the positions shown. Relay contact $AR_2$ in its new position completes a holding circuit for relay AR between terminals 296 and 297 comprising relay contacts $AP_3$ and $AR_2$ in their new positions and relay AR. The following flip-flop sequence continues; relay AM de-energised, relay AJ energised (third pulse), relay AE energised, relay AK energised, relay AJ de-energised, relay AN energised, relay AK de-energised, relay AL energised (fourth pulse). When relay AL is energised during the fourth pulse, a circuit is completed between negative terminal 296 and positive termnal 298, comprising relay contacts $AL_4$ and $AR_1$ in their new positions, and relay AS. Relay AS is thus energised and changes over its two contacts $AS_{1-2}$ from the positions shown. Relay contact $AS_1$ in its new position completes a holding circuit for relay AS between terminals 296 and 298 comprising relay contacts $AP_3$ and $AS_1$ in their new positions and relay AS. In changing to its new position, relay contact $AS_2$ breaks the holding circuit between terminals 250 and 251 thereby causing the de-energisation of relay CE and thus the de-energisation of the flip-flop circuit. The de-energisation of relay CE while relay AP remains energised for a short period of time effects the energisation of relay AQ which causes the de-energisation of relay CA due to the opening of relay contact $AQ_1$. Relay AP finally de-energises and causes the de-energisation of relays CJ, CN, CW, AE, AR and AS. Finally relay AQ de-energises and the control system is once more in the starting condition.

The control circuit has been described on the assumption that the person requires initially to select the major matrix $P_1$ and thereby has to operate the control switch 218 in order to energise the relay CA associated with the selection of the major matrix $P_1$. The person may of course wish to initially select, instead of the major matrix $P_1$, any one of the major matrices $P_2$, $S_1$, $S_2$. These major matrices are respectively selected by the operation of control switches 220, 221, 222 which, when operated respectively effect the energisation of relays CB, CC and CD. In order to close the contacts of control switch 220 to energise relay CB the operator must apply to the mouthpiece a pressure of the order of 8 cm. water gauge above the atmospheric pressure. The operator while applying this pressure to the mouthpiece will operate control swtich 218 which is sensitive, as previously described, to a pressure of the order of 3 cm. water gauge above the atmospheric pressure. It will thus be seen that, unless special precautions are taken, relay CA will be initially energised instead of relay CB. The presence of relay AT with its capacitor 241 prevents this happening since, as has been described, relay AT is energised before the person operates the typewriter circuit. Relay contact $AT_1$ is therefore changed over from the position shown, and the capacitance of capacitor 241 is such that the relay contact $AT_1$ does not return to the position shown until the operator has had time to build up sufficient pressure to close the contacts of control switch 220. Similarly the presence of relay contact $AT_2$ prevents relay CC from being energised before relay CD, the control switches 221 and 222 associated with relays CC and CD requiring for operation suctions of the orders of 3 cm. and 8 cm. below the atmospheric pressure respectively.

Relays CA and CC have, in parallel therewith, capacitors 247 and 277, as hereinbefore described, and relays CB and CD are arranged in parallel with capacitors 300 and 301. The capacitors 247, 277, 300 and 301 perform the same function as relay AT when the operator, when selecting a particular sub-matrix, transfers from one level of pressure to another level via a third intermediate level. Thus if the operator requires to energise relay CD following the energisation of relay CA, relay contact $CA_2$ is kept open, due to the continued energisation of relay CA by virtue of capacitor 247, for a period of time sufficient for the operator to build up to the level of suction required to operate control switch 222.

I claim:

1. A control circuit for operation by an at least partially paralyzed person, said circuit comprising switch means movable to a plurality of positions in response to relatively small pressure differences of the order of magnitude of respiratory pressures, a plurality of controlled circuits for performing individual operations, selector means, drive means operatively connected to said selector means by said switch means when said switch means is in one of said positions to drive said selector means through a plurality of successive selecting positions each corresponding to one of said controlled circuits, whereby the position selected by said selector means is at least partially dependent upon the length of time said switch means is in said one position, and a normally open energizing connection for each controlled circuit which is only partially closed by said selector means when it reaches the selecting position corresponding to that controlled circuit, said selector means comprising means responsive to a further change in the position of said switch means for fully completing said energizing connection.

2. A control circuit as claimed in claim 1 in which said switch means is a single switch and said connection completing means is connected to be actuated upon opening of said switch.

3. A control circuit as claimed in claim 1 in which said switch means comprises two switches, said drive means is connected to drive said selector means upon closure of one of said switches and said connection completing means is connected to be actuated upon closure of the other of said switches.

4. A control circuit is claimed in claim 1 in which said switch means comprises two switches, said drive means is connected to drive said selector means upon closure of one of said switches and said connection completing means is connected to be actuated upon successive closure and opening of the other switch.

5. A control circuit as claimed in claim 1, comprising also indicating means for indicating the particular controlled circuit which, at any instant, has been selected.

6. A control circuit as claimed in claim 5, comprising also indicating means for indicating the particular controlled circuit which has been energised.

7. A control circuit for operation by an at least partially paralyzed person, said circuit comprising a switch responsive to relatively small pressure differences of the order of magnitude of respiratory pressures, a plurality of controlled circuits for performing individual operations, selector means, drive means operatively connected to said selector means by said switch when said switch is closed to drive said selector means through a plurality of successive selecting positions each corresponding to one of said controlled circuits, whereby the position selected by said selector means is at least partially dependent upon the length of time said switch is closed, and a normally open energizing connection for each controlled circuit which is only partially closed by said selector means when it reaches the selecting position corresponding to that controlled circuit, said selector means comprising means actuated upon the subsequent opening of said switch for fully completing said energizing connection.

8. A control circuit for operation by an at least partially paralyzed person, said circuit comprising first and second switches responsive to relatively small pressure differences of the order of magnitude of respiratory pressures, a plurality of controlled circuits for performing individual operations, selector means, drive means operatively connected to said selector means by said first switch when said first switch is closed to drive said selector means through a plurality of successive selecting positions each corresponding to one of said controlled circuits, whereby the position selected by said selector means is at least partially dependent upon the length of time said first switch is closed, and a normally open energizing connection for each controlled circuit which is only partially closed by said selector means when it reaches the selecting position corresponding to that controlled circuit, said selector means comprising means actuated upon the subsequent operation of said second switch for fully completing said energizing connection.

9. A control circuit for operation by an at least partially paralyzed person, said circuit comprising a plurality of switches responsive to relatively small pressure differences of the order of magnitude of respiratory pressures, a plurality of controlled circuits for performing individual operations, said controlled circuits being divided into groups and each group being divided into sub-groups, each of said switches being connected to complete, when closed, an energizing connection to one of said groups, a normally open connection between the energizing connection to each group and each sub-group within that group and between the connection to each sub-group and each controlled circuit within that sub-group, selector means for selectively energizing any selected controlled circuit, and drive means operatively connected to said selector means by closure of any one of said switches to drive said selector means through a plurality of successive selecting positions, in each of which it partially closes the normally open connections between said energizing connection and a selected controlled circuit within the selected group, whereby the position selected by said selector means is at least in part dependent upon the length of time said drive means is connected to said selector means, said selector means comprising means responsive to operation of another of said switches to fully close the partially closed connections to the selected controlled circuit.

10. A control circuit as claimed in claim 9 in which said drive means is a flip-flop circuit producing timed pulses and selector means is connected to close the normally open connection to a selected sub-group and the normally open connection to a selected controlled circuit within the selected sub-group successively upon receipt of pulses from said flip-flop circuit when connected thereto.

11. A control circuit as claimed in claim 9 comprising four switches responsive to pressure differences, two of which are responsive to different pressures in excess of atmospheric pressures and two of which are responsive to different pressures below atmospheric, and a single mouthpiece to which all of said switches are connected.

12. A control circuit as claimed in claim 9 comprising also indicating means connected to indicate the particular pressure responsive switch operated, the duration of operation thereof, and the duration of cessation of operation thereof.

13. A control circuit as claimed in claim 12 comprising also cancelling means for breaking the energizing connection to the selected group if the first closed pressure responsive switch is held closed for longer than a predetermined period.

14. A control circuit as claimed in claim 13 comprising also cancelling means for breaking the energizing connection to the selected group if the duration of cessation of operation of the first operated pressure responsive switch prior to the operation of the second operated pressure responsive switch exceeds a predeterimned period.

References Cited by the Examiner
UNITED STATES PATENTS

| 2,221,963 | 11/1940 | Case et al. | 200—81.9 X |
| 2,475,168 | 7/1949 | Workman | 200—81.9 X |
| 2,685,615 | 8/1954 | Biddulph et al. | 340—148 X |
| 2,805,379 | 9/1957 | Troeller et al. | 325—393 X |
| 2,885,686 | 5/1959 | Giamo | 3—1.1 |

NEIL C. READ, *Primary Examiner.*

P. XIARHOS, *Assistant Examiner.*